US012812341B2

(12) United States Patent
Xing et al.

(10) Patent No.: US 12,812,341 B2
(45) Date of Patent: Nov. 24, 2026

(54) SERVICE PROCESSING METHOD FOR PROXIMITY SERVICE, DEVICE, AND SYSTEM

(71) Applicant: HUAWEI TECHNOLOGIES CO., LTD., Shenzhen (CN)

(72) Inventors: Weijun Xing, Shanghai (CN); Hui Ding, Xi'an (CN); Di Zhang, Shenzhen (CN); Wenfu Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 587 days.

(21) Appl. No.: 17/935,936

(22) Filed: Sep. 27, 2022

(65) Prior Publication Data

US 2023/0023571 A1 Jan. 26, 2023

Related U.S. Application Data

(63) Continuation of application No. PCT/CN2021/083602, filed on Mar. 29, 2021.

(30) Foreign Application Priority Data

Apr. 9, 2020 (CN) ......................... 202010274705.8

(51) Int. Cl.
*H04W 4/24* (2024.01)
*H04M 15/00* (2006.01)
(Continued)

(52) U.S. Cl.
CPC ............. *H04W 4/24* (2013.01); *H04M 15/66* (2013.01); *H04W 76/10* (2018.02); *H04W 40/22* (2013.01); *H04W 80/10* (2013.01); *H04W 88/04* (2013.01)

(58) Field of Classification Search
CPC ... H04L 2/1407; H04L 65/80; H04L 61/5007; H04M 15/61; H04M 15/66; H04M 15/93;
(Continued)

(56) References Cited

U.S. PATENT DOCUMENTS

2019/0357177 A1* 11/2019 Kuang .................. H04W 88/04
2020/0053547 A1* 2/2020 Baek ...................... H04W 8/005
(Continued)

FOREIGN PATENT DOCUMENTS

CN 106454993 A 2/2017
CN 106535083 A 3/2017
(Continued)

OTHER PUBLICATIONS

3GPP TS 23.303 V15.1.0 (Jun. 2018), 3rd Generation Partnership Project; Technical Specification Group Services and System Aspects; Proximity-based services (ProSe); Stage 2 (Release 15), 130 pages.
(Continued)

*Primary Examiner* — Khawar Iqbal

(57) ABSTRACT

This application discloses a service processing method for a proximity service, a device, and a system, and relates to the field of wireless communication technologies, to resolve a problem such as inappropriate charging caused because a network side does not perform, in proximity service (ProSe) communication, service supervision or service management on a data packet transmitted by remote user equipment (UE) via relay UE. In this application, a first network element (for example, an access and mobility management function AMF network element or a session management function SMF network element) may obtain, based on relay information that is received from the remote UE and that includes a relay service code or first indication information indicating that the remote UE is to transmit a service in relay mode, policy
(Continued)

configuration information for detecting or monitoring service data forwarded by the relay UE.

20 Claims, 21 Drawing Sheets

(51) Int. Cl.

| | |
|---|---|
| ***H04W 76/10*** | (2018.01) |
| ***H04W 88/04*** | (2009.01) |
| *H04W 40/22* | (2009.01) |
| *H04W 80/10* | (2009.01) |

(58) Field of Classification Search

CPC ....... H04W 4/24; H04W 40/00; H04W 40/02; H04W 40/22; H04W 76/10; H04W 76/14; H04W 88/04

See application file for complete search history.

(56) References Cited

U.S. PATENT DOCUMENTS

| | | | | |
|---|---|---|---|---|
| 2020/0068385 | A1 | 2/2020 | Yu | |
| 2022/0240122 | A1* | 7/2022 | Liu | H04B 17/309 |
| 2022/0264442 | A1* | 8/2022 | Yang | H04L 5/0092 |
| 2022/0287116 | A1* | 9/2022 | Kim | H04W 76/12 |
| 2022/0322202 | A1* | 10/2022 | Li | H04L 69/14 |
| 2022/0338000 | A1* | 10/2022 | Lee | H04W 12/71 |
| 2022/0353799 | A1* | 11/2022 | Talebi Fard | H04W 76/10 |
| 2023/0023571 | A1* | 1/2023 | Xing | H04M 15/93 |
| 2023/0053351 | A1* | 2/2023 | Cheng | H04W 8/005 |
| 2023/0354085 | A1* | 11/2023 | Deng | H04W 76/11 |
| 2025/0056635 | A1* | 2/2025 | Li | H04W 76/14 |
| 2025/0310823 | A1* | 10/2025 | Xu | H04W 28/0268 |

FOREIGN PATENT DOCUMENTS

| | | | |
|---|---|---|---|
| CN | 107079370 | A | 8/2017 |
| CN | 108207011 | A | 6/2018 |
| CN | 108702722 | A | 10/2018 |
| CN | 109548008 | A | 3/2019 |
| CN | 110972092 | A | 4/2020 |
| CN | 109716810 | B | 8/2020 |
| WO | 2017028294 | A1 | 2/2017 |
| WO | 2018126534 | A1 | 7/2018 |

OTHER PUBLICATIONS

S2-2000909, InterDigital Inc., Update Solution 6 for Service Authorization, Provisioning and Discovery, SA WG2 Meeting #136AH, Jan. 13-17, 2020, Incheon, KR, 4 pages.

InterDigital Inc., "Solution for KI #3: Support of UE-to-Network Relay", SA WG2 Meeting #136 S2-1911798, Nov. 18-22, 2019, Reno, US, Total 5 Pages.

3GPP TS 23.502 V16.4.0 (Mar. 2020), 3rd Generation Partnership Project; Technical Specification Group Services and System Aspects; Procedures for the 5G System (5GS); Stage 2(Release 16), 582 pages.

3GPP TS 23.503 V16.4.1 (Apr. 2020), 3rd Generation Partnership Project; Technical Specification Group Services and System Aspects; Policy and charging control framework for the 5G System (5GS); Stage 2(Release 16), 115 pages.

* cited by examiner

SERVICE PROCESSING METHOD FOR PROXIMITY SERVICE, DEVICE, AND SYSTEM

CROSS-REFERENCE TO RELATED APPLICATIONS

This application is a continuation of International Application No. PCT/CN2021/083602, filed on Mar. 29, 2021, which claims priority to Chinese Patent Application No. 202010274705.8, filed on Apr. 9, 2020. The disclosures of the aforementioned applications are hereby incorporated by reference in their entireties.

TECHNICAL FIELD

Embodiments of this application relate to the field of wireless communication technologies, and in particular, to a service processing method for a proximity service, a device, and a system.

BACKGROUND

As intelligent terminals are widely used, ProSe communication is increasingly widely applied, to improve a spectrum utilization rate and a system throughput, expand network coverage, and so on. In the ProSe communication, a communication link may be directly established between terminals, and the terminals directly communicate with each other over the communication link without via an access network device.

As shown in FIG. 1, in a ProSe architecture of a 5th-generation (5G) communication system, if a ProSe communication link of a PC5 interface is established between a terminal 1 and a terminal 2, the terminal 1 may establish connections to and communicate with a radio access network (RAN) and a core network through the PC5 interface and a Uu interface between the terminal 2 and a RAN device. In the foregoing scenario, the terminal 1 is also referred to as a remote UE, and the terminal 2 is also referred to as relay UE (UE-to-network relay UE).

In conventional ProSe communication, a network side performs service supervision or service management on none of data packets transmitted by remote UE via relay UE. This causes a problem such as inappropriate charging.

SUMMARY

This application provides a service processing method for a proximity service, a device, and a system, to resolve a problem such as inappropriate charging caused because a network side does not perform, in ProSe communication, service supervision or service management on a data packet transmitted by remote UE via relay UE.

To achieve the foregoing objective, the following technical solutions are used in embodiments of this application.

According to a first aspect, a proximity service communication method is provided. The method includes: A first network element receives relay information that is of remote UE and that includes first indication information or a relay service code, where the first indication information indicates that the remote UE is to transmit a service in relay mode. The first network element obtains policy configuration information based on the relay information.

According to the technical solution provided in the first aspect, the first network element (for example, an AMF network element or an SMF network element) may obtain, based on the relay information that is received from the remote UE and that includes the relay service code or the first indication information indicating that the remote UE is to transmit the service in relay mode, the policy configuration information for detecting or monitoring service data forwarded by relay UE, to resolve a problem such as inappropriate charging caused because a network side does not perform, in ProSe communication, service supervision or service management on a data packet transmitted by the remote UE via the relay UE.

In an embodiment, when the relay information includes the first indication information, the policy configuration information includes information about a service that the remote UE is allowed to transmit in relay mode; or when the relay information includes the relay service code, the policy configuration information includes information about a service corresponding to the relay service code. This solution supports the remote UE in notifying, by using the relay service code or the first indication information, the first network element that the remote UE needs to transmit the service in relay mode, so that the first network element obtains, based on the relay service code or the first indication information, the policy configuration information for detecting or monitoring the service data forwarded by the relay UE.

In an embodiment, the first network element is an AMF network element. The information about the service that the remote UE is allowed to transmit in relay mode includes user policy information or access management policy information of the service that the remote UE is allowed to transmit in relay mode. The information about the service corresponding to the relay service code includes user policy information or access management policy information of the service corresponding to the relay service code. This solution supports the first network element in separately obtaining, based on the relay service code or the first indication information, different policy configuration information for detecting or monitoring the service data forwarded by the relay UE, to resolve the problem such as the inappropriate charging caused because the network side does not perform, in the ProSe communication, service supervision or service management on the data packet transmitted by the remote UE via the relay UE.

In an embodiment, the relay information includes the first indication information. That the first network element obtains policy configuration information based on the relay information includes: The first network element obtains the policy configuration information from a PCF network element based on the first indication information. This solution supports the first network element in obtaining, from the PCF network element based on the first indication information, the policy configuration information for detecting or monitoring the service data forwarded by the relay UE, to resolve the problem such as the inappropriate charging caused because the network side does not perform, in the ProSe communication, service supervision or service management on the data packet transmitted by the remote UE via the relay UE.

In an embodiment, the method further includes: The AMF network element determines, based on the policy configuration information, that the remote UE is allowed to transmit a first service of the remote UE in relay mode; and the AMF network element sends, to an SMF network element, a request message requesting to establish or modify a PDU session of the remote UE. Alternatively, the AMF network element determines, based on the policy configuration information, that the remote UE is not allowed to transmit the first service in relay mode; and the AMF network element sends, to the remote UE, indication information indicating rejection of transmitting the first service by the remote UE in relay mode. This solution supports the AMF network element in monitoring, based on the relay information from the remote UE, a service of the remote UE forwarded by the relay UE.

In an embodiment, the first network element is an SMF network element. The method further includes: The first network element sends the policy configuration information to a UPF network element. This solution supports the SMF in determining the policy configuration information used by the UPF network element to monitor a service of the remote UE forwarded by the relay UE, and sending the policy configuration information to the UPF network element.

In an embodiment, the relay information includes the relay service code. That the first network element obtains policy configuration information based on the relay information includes: The first network element determines the service corresponding to the relay service code. The first network element obtains, from a PCF network element, a PCC rule of the service corresponding to the relay service code. The first network element determines the policy configuration information according to the PCC rule. This solution supports the first network element in determining the policy configuration information according to the PCC rule that is of the service corresponding to the relay service code and that is obtained from the PCF network element, where the policy configuration information is for detecting or monitoring the service data forwarded by the relay UE, to resolve the problem such as the inappropriate charging caused because the network side does not perform, in the ProSe communication, service supervision or service management on the data packet transmitted by the remote UE via the relay UE.

In an embodiment, that the first network element determines the service corresponding to the relay service code includes: The first network element obtains, from an AF network element, the service corresponding to the relay service code; the first network element obtains, from a UDM network element or a UDR network element via the PCF network element, the service corresponding to the relay service code; or the first network element obtains, from the UDM network element or the UDR network element, the service corresponding to the relay service code. This solution supports the first network element in determining, based on a predetermined correspondence between a relay service code and service information, the service corresponding to the relay service code. The correspondence between the relay service code and the service information may be preset in the PCF network element, the UDM network element, or the UDR network element.

In an embodiment, the relay information includes the relay service code. That the first network element obtains policy configuration information based on the relay information includes: The first network element sends, to a PCF network element, a PCC rule request message carrying the relay service code. The first network element receives, from the PCF network element, a PCC rule of the service corresponding to the relay service code. The first network element determines the policy configuration information according to the PCC rule. This solution supports the first network element in determining the policy configuration information according to the PCC rule that is of the service corresponding to the relay service code and that is obtained from the PCF network element, where the policy configuration information is for detecting or monitoring the service data forwarded by the relay UE, to resolve the problem such as the inappropriate charging caused because the network side does not perform, in the ProSe communication, service supervision or service management on the data packet transmitted by the remote UE via the relay UE.

In an embodiment, the relay information includes the relay service code. That the first network element obtains policy configuration information based on the relay information includes: The first network element sends, to a PCF network element, a PCC rule request message carrying the relay service code and identification information of the remote UE. The first network element receives, from the PCF network element, a PCC rule including a PCC rule of a service to which the remote UE subscribes and that corresponds to the relay service code. The first network element determines the policy configuration information according to the PCC rule. This solution supports the first network element in determining the policy configuration information according to the PCC rule that is obtained from the PCF network element and that is of the service to which the remote UE subscribes and that corresponds to the relay service code, where the policy configuration information is for detecting or monitoring the service data forwarded by the relay UE, to resolve the problem such as the inappropriate charging caused because the network side does not perform, in the ProSe communication, service supervision or service management on the data packet transmitted by the remote UE via the relay UE.

In an embodiment, the relay information is carried in a PDU session establishment request message, a PDU session modification request message, or a NAS message. A transmission mode of the relay information is not limited in this solution. For example, the relay information may be carried in the PDU session establishment request message, the PDU session modification request message, or the NAS message.

According to a second aspect, a proximity service communication method is provided. The method includes: Remote UE determines to transmit data of a first service by using relay UE. The remote UE sends, to the relay UE, a first message carrying relay information of the remote UE, where the relay information includes first indication information indicating that the remote UE is to transmit a service in relay mode or a relay service code corresponding to the first service.

According to the technical solution provided in the second aspect, when determining to transmit the data of the first service in relay mode, the remote UE may send, to the relay UE, the relay information including the relay service code or the first indication information indicating that the remote UE is to transmit the service in relay mode, so that the relay UE indicates, to a first network element, that the remote UE is to transmit the data of the first service in relay mode and policy configuration information used by a network side to detect or monitor service data forwarded by the relay UE, to resolve a problem such as inappropriate charging caused because the network side does not perform, in ProSe communication, service supervision or service management on a data packet transmitted by the remote UE via the relay UE.

In an embodiment, the first message is a PDU session establishment request message, a PDU session modification request message, or a NAS message. A transmission mode of the relay information is not limited in this solution. For example, the relay information may be carried in the PDU session establishment request message, the PDU session modification request message, or the NAS message.

In an embodiment, the method further includes: The remote UE receives first information for representing a service that the remote UE is allowed to transmit in relay mode. That remote UE determines to transmit data of a first service by using relay UE includes: The remote UE determines, based on the first information, to transmit the data of the first service in relay mode. This solution supports the remote UE in directly determining, based on predetermined information about a service that can be transmitted by using the relay UE, whether to transmit the service by using the relay UE.

In an embodiment, the first information includes a correspondence between a relay service code and service information. The method further includes: The remote UE determines, based on the first information and service information of the first service, the relay service code corresponding to the first service, where the service information includes at least one of the following: a service type, a service identifier, or an application identifier. This solution supports the remote UE in directly determining, based on information about a service that can be transmitted by using the relay UE and a predetermined correspondence between the information about the service and a relay service code, the relay service code corresponding to the service and whether to transmit the service by using the relay UE.

In an embodiment, the first information includes one or more of the following information: a data network name DNN, single network slice selection assistance information S-NSSAI, an application identifier application ID, or an application function identifier AF ID. This solution supports the remote UE in determining, based on predetermined information, for example, the DNN, the S-NSSAI, the application ID, or the AF ID, corresponding to a service that can be transmitted by using the relay UE, whether to transmit the service by using the relay UE.

In an embodiment, that the remote UE receives first information includes: The remote UE receives the first information from a second network element, where the second network element is an AF network element or a PCF network element; or the remote UE receives the first information from an application server of the first service. This solution supports the AF network element, the PCF network element, or the application server of the service in managing the predetermined first information.

According to a third aspect, a proximity service communication method is provided. The method includes: A second network element obtains first information for representing a service that remote user equipment UE is allowed to transmit by using relay UE. The second network element sends the first information to the remote UE.

According to the technical solution provided in the third aspect, the second network element sends, to the remote UE, the predetermined first information for representing the service that the remote user equipment UE is allowed to transmit by using the relay UE, so that when having a service transmission requirement, the remote UE can determine, based on the first information, whether to transmit the service in relay mode and whether to send, to a first network element, relay information for representing that the remote UE is to transmit the service in relay mode, to facilitate detecting, monitoring, or the like performed by a network side on service data forwarded by the relay UE.

In an embodiment, the first information includes a correspondence between a relay service code and service information, and the service information includes at least one of the following: a service type, a service identifier, or an application identifier. This solution supports predetermining of the correspondence between the relay service code and the service information, so that when having the service transmission requirement, the remote UE can determine, based on the correspondence between the relay service code and the service information, whether to transmit a service in relay mode and whether to send, to the first network element, the relay service code corresponding to the service, to facilitate detecting, monitoring, or the like performed by the network side on the service data forwarded by the relay UE.

In an embodiment, the first information includes one or more of the following information: a data network name DNN, single network slice selection assistance information S-NSSAI, an application identifier application ID, or an application function identifier AF ID. This solution supports the remote UE in determining, based on predetermined information, for example, the DNN, the S-NSSAI, the application ID, or the AF ID, corresponding to a service that can be transmitted by using the relay UE, whether to transmit the service by using the relay UE.

In an embodiment, the method further includes: The second network element obtains the first information from a UDM network element or a UDR network element. This solution supports the UDM network element or the UDR network element in storing the predetermined first information.

In an embodiment, the second network element is an AF network element or a PCF network element. This solution supports the AF network element or the PCF network element in managing the predetermined first information.

In an embodiment, the second network element is the PCF network element. The method further includes: The PCF network element receives, from a first network element, a PCC rule request message carrying relay information, where the relay information includes first indication information or a relay service code, and the first indication information indicates that the remote UE is to transmit a service in relay mode. The PCF network element sends policy configuration information to the first network element based on the received relay information. This solution supports the PCF network element in determining the policy configuration information based on the received first indication information or relay service code and sending the policy configuration information to the first network element, where the policy configuration information is used by the network side to detect or monitoring the service data forwarded by the relay UE, to resolve a problem such as inappropriate charging caused because the network side does not perform, in ProSe communication, service supervision or service management on a data packet transmitted by the remote UE via the relay UE.

In an embodiment, when the PCC rule request message carries the first indication information, the policy configuration information includes information about the service that the remote UE is allowed to transmit in relay mode; or when the PCC rule request message carries the relay service code, the policy configuration information includes information about a service corresponding to the relay service code. This solution supports the PCF network element in separately obtaining, based on the relay service code or the first indication information, different policy configuration information for detecting or monitoring the service data forwarded by the relay UE, to resolve the problem such as the inappropriate charging caused because the network side does not perform, in the ProSe communication, service supervision or service management on the data packet transmitted by the remote UE via the relay UE.

In an embodiment, the second network element is the PCF network element. The method further includes: The PCF network element receives, from a first network element, a PCC rule request message carrying first service information, where the first service information includes at least one of the following: a service type, a service identifier, or an application identifier. The PCF network element sends, to the first network element, a PCC rule of a service corresponding to the first service information. This solution supports the PCF network element in determining policy configuration information based on received service information of the service that the remote UE is to transmit in relay mode and sending the policy configuration information to the first network element, where the policy configuration information is used by the network side to detect or monitor the service data forwarded by the relay UE, to resolve a problem such as inappropriate charging caused because the network side does not perform, in ProSe communication, service supervision or service management on a data packet transmitted by the remote UE via the relay UE.

In an embodiment, the relay information includes the relay service code, and the PCC rule request message further carries identification information of the remote UE. The policy configuration information includes a PCC rule of a service to which the remote UE subscribes and that corresponds to the relay service code. This solution supports the PCF network element in determining, based on the received relay service code and identification information of the remote UE, the policy configuration information and the PCC rule of the service to which the remote UE subscribes and that corresponds to the relay service code, where the policy configuration information is for detecting or monitoring the service data forwarded by the relay UE, to resolve the problem such as the inappropriate charging caused because the network side does not perform, in the ProSe communication, service supervision or service management on the data packet transmitted by the remote UE via the relay UE.

In an embodiment, the first network element is an SMF network element or an AMF network element. This solution supports the first network element such as the SMF network element or the AMF network element in obtaining the policy configuration information for detecting or monitoring the service data forwarded by the relay UE.

According to a fourth aspect, a first network element is provided. The first network element includes: a transceiver unit, configured to receive relay information that is of remote UE and that includes first indication information or a relay service code, where the first indication information indicates that the remote UE is to transmit a service in relay mode; and a processing unit, configured to obtain policy configuration information based on the relay information.

According to the technical solution provided in the fourth aspect, the first network element (for example, an AMF network element or an SMF network element) may obtain, based on the relay information that is received from the remote UE and that includes the relay service code or the first indication information indicating that the remote UE is to transmit the service in relay mode, the policy configuration information for detecting or monitoring service data forwarded by relay UE, to resolve a problem such as inappropriate charging caused because a network side does not perform, in ProSe communication, service supervision or service management on a data packet transmitted by the remote UE via the relay UE.

In an embodiment, when the relay information includes the first indication information, the policy configuration information includes information about a service that the remote UE is allowed to transmit in relay mode; or when the relay information includes the relay service code, the policy configuration information includes information about a service corresponding to the relay service code. This solution supports the remote UE in notifying, by using the relay service code or the first indication information, the first network element that the remote UE needs to transmit the service in relay mode, so that the first network element obtains, based on the relay service code or the first indication information, the policy configuration information for detecting or monitoring the service data forwarded by the relay UE.

In an embodiment, the first network element is an AMF network element. The information about the service that the remote UE is allowed to transmit in relay mode includes user policy information or access management policy information of the service that the remote UE is allowed to transmit in relay mode. The information about the service corresponding to the relay service code includes user policy information or access management policy information of the service corresponding to the relay service code. This solution supports the first network element in separately obtaining, based on the relay service code or the first indication information, different policy configuration information for detecting or monitoring the service data forwarded by the relay UE, to resolve the problem such as the inappropriate charging caused because the network side does not perform, in the ProSe communication, service supervision or service management on the data packet transmitted by the remote UE via the relay UE.

In an embodiment, the relay information includes the first indication information. That the processing unit obtains the policy configuration information based on the relay information includes: The processing unit obtains the policy configuration information from a PCF network element via the transceiver unit based on the first indication information. This solution supports the first network element in obtaining, from the PCF network element based on the first indication information, the policy configuration information for detecting or monitoring the service data forwarded by the relay UE, to resolve the problem such as the inappropriate charging caused because the network side does not perform, in the ProSe communication, service supervision or service management on the data packet transmitted by the remote UE via the relay UE.

In an embodiment, the processing unit is further configured to determine, based on the policy configuration information, that the remote UE is allowed to transmit a first service of the remote UE in relay mode; and the transceiver unit is further configured to send, to an SMF network element, a request message requesting to establish or modify a PDU session of the remote UE. Alternatively, the processing unit is configured to determine, based on the policy configuration information, that the remote UE is not allowed to transmit the first service in relay mode; and the transceiver unit is configured to send, to the remote UE, indication information indicating rejection of transmitting the first service by the remote UE in relay mode. This solution supports the AMF network element in monitoring, based on the relay information from the remote UE, a service of the remote UE forwarded by the relay UE.

In an embodiment, the first network element is an SMF network element. The transceiver unit is further configured to send the policy configuration information to a UPF network element. This solution supports the SMF in determining the policy configuration information used by the UPF network element to monitor a service of the remote UE forwarded by the relay UE, and sending the policy configuration information to the UPF network element.

In an embodiment, the relay information includes the relay service code. That the processing unit obtains the policy configuration information based on the relay information includes: The processing unit determines the service corresponding to the relay service code. The processing unit obtains, from a PCF network element via the transceiver unit, a PCC rule of the service corresponding to the relay service code. The processing unit determines the policy configuration information according to the PCC rule. This solution supports the first network element in determining the policy configuration information according to the PCC rule that is of the service corresponding to the relay service code and that is obtained from the PCF network element, where the policy configuration information is for detecting or monitoring the service data forwarded by the relay UE, to resolve the problem such as the inappropriate charging caused because the network side does not perform, in the ProSe communication, service supervision or service management on the data packet transmitted by the remote UE via the relay UE.

In an embodiment, that the processing unit determines the service corresponding to the relay service code includes: The processing unit obtains, from an AF network element via the transceiver unit, the service corresponding to the relay service code; the processing unit obtains, from a UDM network element or a UDR network element via the transceiver unit and the PCF network element, the service corresponding to the relay service code; or the processing unit obtains, from the UDM network element or the UDR network element via the transceiver unit, the service corresponding to the relay service code. This solution supports the first network element in determining, based on a predetermined correspondence between a relay service code and service information, the service corresponding to the relay service code. The correspondence between the relay service code and the service information may be preset in the PCF network element, the UDM network element, or the UDR network element.

In an embodiment, the relay information includes the relay service code. That the processing unit obtains the policy configuration information based on the relay information includes: The processing unit sends, to a PCF network element via the transceiver unit, a PCC rule request message carrying the relay service code, and receives, from the PCF network element, a PCC rule of the service corresponding to the relay service code. The processing unit determines the policy configuration information according to the PCC rule. This solution supports the first network element in determining the policy configuration information according to the PCC rule that is of the service corresponding to the relay service code and that is obtained from the PCF network element, where the policy configuration information is for detecting or monitoring the service data forwarded by the relay UE, to resolve the problem such as the inappropriate charging caused because the network side does not perform, in the ProSe communication, service supervision or service management on the data packet transmitted by the remote UE via the relay UE.

In an embodiment, the relay information includes the relay service code. That the processing unit obtains the policy configuration information based on the relay information includes: The processing unit sends, to a PCF network element via the transceiver unit, a PCC rule request message carrying the relay service code and identification information of the remote UE, and receives, from the PCF network element, a PCC rule including a PCC rule of a service to which the remote UE subscribes and that corresponds to the relay service code. The processing unit determines the policy configuration information according to the PCC rule. This solution supports the first network element in determining the policy configuration information according to the PCC rule that is obtained from the PCF network element and that is of the service to which the remote UE subscribes and that corresponds to the relay service code, where the policy configuration information is for detecting or monitoring the service data forwarded by the relay UE, to resolve the problem such as the inappropriate charging caused because the network side does not perform, in the ProSe communication, service supervision or service management on the data packet transmitted by the remote UE via the relay UE.

In an embodiment, the relay information is carried in a PDU session establishment request message, a PDU session modification request message, or a NAS message. A transmission mode of the relay information is not limited in this solution. For example, the relay information may be carried in the PDU session establishment request message, the PDU session modification request message, or the NAS message.

According to a fifth aspect, remote UE is provided. The remote UE includes a processing unit, configured to determine to transmit data of a first service by using relay UE; and a transceiver unit, configured to send, to the relay UE, a first message carrying relay information of the remote UE, where the relay information includes first indication information indicating that the remote UE is to transmit a service in relay mode or a relay service code corresponding to the first service.

According to the technical solution provided in the fifth aspect, when determining to transmit the data of the first service in relay mode, the remote UE may send, to the relay UE, the relay information including the relay service code or the first indication information indicating that the remote UE is to transmit the service in relay mode, so that the relay UE indicates, to a first network element, that the remote UE is to transmit the data of the first service in relay mode and policy configuration information used by a network side to detect or monitor service data forwarded by the relay UE, to resolve a problem such as inappropriate charging caused because the network side does not perform, in ProSe communication, service supervision or service management on a data packet transmitted by the remote UE via the relay UE.

In an embodiment, the first message is a PDU session establishment request message, a PDU session modification request message, or a NAS message. A transmission mode of the relay information is not limited in this solution. For example, the relay information may be carried in the PDU session establishment request message, the PDU session modification request message, or the NAS message.

In an embodiment, the transceiver unit is further configured to receive first information for representing a service that the remote UE is allowed to transmit in relay mode. That the processing unit determines to transmit the data of the first service by using the relay UE includes: The processing unit determines, based on the first information, to transmit the data of the first service in relay mode. This solution supports the remote UE in directly determining, based on predetermined information about a service that can be transmitted by using the relay UE, whether to transmit the service by using the relay UE.

In an embodiment, the first information includes a correspondence between a relay service code and service information. The processing unit is further configured to determine, based on the first information and service information of the first service, the relay service code corresponding to the first service, where the service information includes at least one of the following: a service type, a service identifier, or an application identifier. This solution supports the remote UE in directly determining, based on information about a service that can be transmitted by using the relay UE and a predetermined correspondence between the information about the service and a relay service code, the relay service code corresponding to the service and whether to transmit the service by using the relay UE.

In an embodiment, the first information includes one or more of the following information: a data network name DNN, single network slice selection assistance information S-NSSAI, an application identifier application ID, or an application function identifier AF ID. This solution supports the remote UE in determining, based on predetermined information, for example, the DNN, the S-NSSAI, the application ID, or the AF ID, corresponding to a service that can be transmitted by using the relay UE, whether to transmit the service by using the relay UE.

In an embodiment, that the transceiver unit receives the first information includes: The transceiver unit receives the first information from a second network element, where the second network element is an AF network element or a PCF network element; or the transceiver unit receives the first information from an application server of the first service. This solution supports the AF network element, the PCF network element, or the application server of the service in managing the predetermined first information.

According to a sixth aspect, a second network element is provided. The second network element includes: a processing unit, configured to obtain first information for representing a service that remote user equipment UE is allowed to transmit by using relay UE; and a transceiver unit, configured to send the first information to the remote UE.

According to the technical solution provided in the sixth aspect, the second network element sends, to the remote UE, the predetermined first information for representing the service that the remote user equipment UE is allowed to transmit by using the relay UE, so that when having a service transmission requirement, the remote UE can determine, based on the first information, whether to transmit the service in relay mode and whether to send, to a first network element, relay information for representing that the remote UE is to transmit the service in relay mode, to facilitate detecting, monitoring, or the like performed by a network side on service data forwarded by the relay UE.

In an embodiment, the first information includes a correspondence between a relay service code and service information, and the service information includes at least one of the following: a service type, a service identifier, or an application identifier. This solution supports predetermining of the correspondence between the relay service code and the service information, so that when having the service transmission requirement, the remote UE can determine, based on the correspondence between the relay service code and the service information, whether to transmit a service in relay mode and whether to send, to the first network element, the relay service code corresponding to the service, to facilitate detecting, monitoring, or the like performed by the network side on the service data forwarded by the relay UE.

In an embodiment, the first information includes one or more of the following information: a data network name DNN, single network slice selection assistance information S-NSSAI, an application identifier application ID, or an application function identifier AF ID. This solution supports the remote UE in determining, based on predetermined information, for example, the DNN, the S-NSSAI, the application ID, or the AF ID, corresponding to a service that can be transmitted by using the relay UE, whether to transmit the service by using the relay UE.

In an embodiment, the transceiver unit is further configured to obtain the first information from a UDM network element or a UDR network element. This solution supports the UDM network element or the UDR network element in storing the predetermined first information.

In an embodiment, the second network element is an AF network element or a PCF network element. This solution supports the AF network element or the PCF network element in managing the predetermined first information.

In an embodiment, the second network element is the PCF network element. The transceiver unit is further configured to: receive, from a first network element, a PCC rule request message carrying relay information, where the relay information includes first indication information or a relay service code, and the first indication information indicates that the remote UE is to transmit a service in relay mode; and send policy configuration information to the first network element based on the received relay information. This solution supports the PCF network element in determining the policy configuration information based on the received first indication information or relay service code and sending the policy configuration information to the first network element, where the policy configuration information is used by the network side to detect or monitor the service data forwarded by the relay UE, to resolve a problem such as inappropriate charging caused because the network side does not perform, in ProSe communication, service supervision or service management on a data packet transmitted by the remote UE via the relay UE.

In an embodiment, when the PCC rule request message carries the first indication information, the policy configuration information includes information about the service that the remote UE is allowed to transmit in relay mode; or when the PCC rule request message carries the relay service code, the policy configuration information includes information about a service corresponding to the relay service code. This solution supports the PCF network element in separately obtaining, based on the relay service code or the first indication information, different policy configuration information for detecting or monitoring the service data forwarded by the relay UE, to resolve the problem such as the inappropriate charging caused because the network side does not perform, in the ProSe communication, service supervision or service management on the data packet transmitted by the remote UE via the relay UE.

In an embodiment, the second network element is the PCF network element. The transceiver unit is further configured to: receive, from a first network element, a PCC rule request message carrying first service information, where the first service information includes at least one of the following: a service type, a service identifier, or an application identifier; and send, to the first network element, a PCC rule of a service corresponding to the first service information. This solution supports the PCF network element in determining policy configuration information based on received service information of the service that the remote UE is to transmit in relay mode and sending the policy configuration information to the first network element, where the policy configuration information is used by the network side to detect or monitor the service data forwarded by the relay UE, to resolve a problem such as inappropriate charging caused because the network side does not perform, in ProSe communication, service supervision or service management on a data packet transmitted by the remote UE via the relay UE.

In an embodiment, the relay information includes the relay service code, and the PCC rule request message further carries identification information of the remote UE. The policy configuration information includes a PCC rule of a service to which the remote UE subscribes and that corresponds to the relay service code. This solution supports the PCF network element in determining, based on the received relay service code and identification information of the remote UE, the policy configuration information and the PCC rule of the service to which the remote UE subscribes and that corresponds to the relay service code, where the policy configuration information is for detecting or monitoring the service data forwarded by the relay UE, to resolve the problem such as the inappropriate charging caused because the network side does not perform, in the ProSe communication, service supervision or service management on the data packet transmitted by the remote UE via the relay UE.

In an embodiment, the first network element is an SMF network element or an AMF network element. This solution supports the first network element such as the SMF network element or the AMF network element in obtaining the policy configuration information for detecting or monitoring the service data forwarded by the relay UE.

According to a seventh aspect, a first network element is provided. The first network element includes: a memory, configured to store a computer program; and a processor, configured to execute the computer program to implement the method in any implementation of the first aspect.

According to an eighth aspect, remote UE is provided. The remote UE includes: a memory, configured to store a computer program; and a processor, configured to execute the computer program to implement the method in any implementation of the second aspect.

According to a ninth aspect, a second network element is provided. The second network element includes: a memory, configured to store a computer program; and a processor, configured to execute the computer program to implement the method in any implementation of the third aspect.

According to a tenth aspect, a communication system is provided. The communication system includes the first network element in any implementation of the fourth aspect or the seventh aspect, the remote UE in any implementation of the fifth aspect or the eighth aspect, and the second network element in any implementation of the sixth aspect or the ninth aspect.

According to an eleventh aspect, a computer-readable storage medium is provided. The computer-readable storage medium stores computer program code. The method in any implementation of the first aspect, the second aspect, or the third aspect is implemented when the computer program code is executed by a processor.

According to a twelfth aspect, a chip system is provided. The chip system includes a processor and a memory. The memory stores computer program code. The method in any implementation of the first aspect, the second aspect, or the third aspect is implemented when the computer program code is executed by the processor. The chip system may include a chip, or may include the chip and another discrete component.

According to a thirteenth aspect, a computer program product is provided. The method in any implementation of the first aspect, the second aspect, or the third aspect is implemented when the computer program product runs on a computer.

DESCRIPTION OF EMBODIMENTS

The following describes technical solutions in this application with reference to accompanying drawings.

Embodiments of this application are applicable to but are not limited to the following communication system: a narrowband internet of things (NB-IoT) system, a wireless local area network (WLAN) system, a long term evolution (LTE) system, a 5th generation mobile communication (5G) system that is also referred to as a new radio (NR) system, a communication system, for example, a 6G system, after 5G, a device-to-device (D2D) communication system, or an internet of vehicles.

Figure 2:
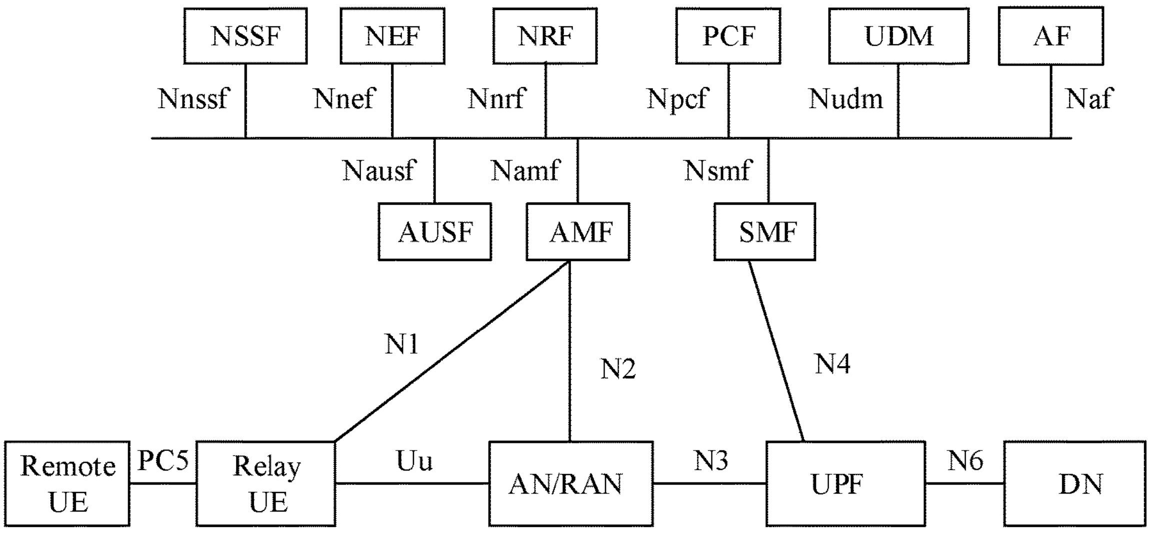
FIG. 2 is a diagram of structures of two types of relay protocol stacks.

FIG. 2 is a diagram of an architecture of a communication network. FIG. 2 shows an interaction relationship between network functions and entities and corresponding interfaces by using a network service architecture of a 5G system as an example. The network architecture is a service-based architecture (SBA).

As shown in FIG. 2, the 5G system includes UE, an access network (AN) or a radio access network (RAN), a user plane function (UPF), a data network (DN), an access and mobility management function (AMF), a session management function (SMF), an authentication server function (AUSF), a policy control function (PCF), an application function (AF), a network slice selection function (NSSF), a unified data management (UDM), a network exposure function (NEF), and a network repository function (NRF). The UPF, the AMF, the SMF, the PCF, the AUSF, and the UDM are all core network devices.

It should be noted that when UE is connected to a network via a relay device, the UE may be referred to as "remote UE". The relay device is a device that may provide the remote UE with access to a cellular network, and may be a device such as a relay station or UE. When the UE acts as the relay device of the remote UE, the UE definitely supports PC5 interface communication. The relay device may be referred to as "relay UE", indicating that the relay device is located within coverage of a mobile network. For example, the relay device can normally access an access network of the 5G system.

As shown in FIG. 2, the remote UE is connected to an AN/RAN device and the core network devices via the relay UE. An interface between the remote UE and the relay UE is a PC5 interface, an interface between the relay UE and the AN/RAN device is a Uu interface, an interface between the remote UE/relay UE and the AMF is an N1 interface, an interface between the AN/RAN device and the AMF is an N2 interface, an interface between the AN/RAN device and the UPF is an N3 interface, an interface between the SMF and the UPF is an N4 interface, and an interface between the UPF and the DN is an N6 interface, Namf is a service-based interface presented by the AMF, Nsmf is a service-based interface presented by the SMF, Nausf is a service-based interface presented by the AUSF, Nnssf is a service-based interface presented by the NSSF, Nnef is a service-based interface presented by the NEF, Nnrf is a service-based interface presented by the NRF, Npcf is a service-based interface presented by the PCF, Nudm is a service-based interface presented by the UDM, and the Naf is a service-based interface presented by the AF.

Main functions of the network elements are described in detail below.

AN/RAN: The AN/RAN may include an AN/RAN device. The AN/RAN device may be base stations in various forms, for example, a macro base station, a micro base station (also referred to as a "small cell"), and a distributed unit-control unit (DU-CU). The DU-CU is a device that is deployed in the radio access network and that can perform wireless communication with UE. In addition, the base station may alternatively be a radio controller in a cloud radio access network (CRAN) scenario, a relay station, an access point, a vehicle-mounted device, a wearable device, a network device in a future evolved public land mobile network (PLMN), or the like. The AN/RAN device may alternatively be a broadband network gateway (BNG), an aggregation switch, a non-3GPP access device, or the like. The AN/RAN device is mainly responsible for functions such as radio resource management, uplink and downlink data classification, quality of service (QoS) management, and data compression and encryption on an air interface side, completing signaling processing with a control plane network element, or completing data forwarding with a user plane function network element. A form and structure of the AN/RAN device are not limited in embodiments of this application.

For example, in systems for which different radio access technologies are used, names of a device having a function of the base station may be different. For example, the base station may be an evolved universal terrestrial radio access network (E-UTRAN) device, for example, an evolved NodeB (eNB or e-NodeB), in LTE, or may be a next generation radio access network (NG-RAN) device (for example, a gNB) in the 5G system.

AMF: The AMF is mainly responsible for processing a control plane message, for example, access control, mobility management, lawful interception, and access authentication/authorization. Functions of the AMF mainly include: (1) processing an access network control plane; (2) processing a non-access stratum (NAS) message, and being responsible for NAS encryption and integrity protection; (3) registration management; (4) connection management; (5) accessibility management; (6) mobility management; (7) intercepting legal information; (8) providing a session management message between the UE and the SMF; (9) implementing transparent transmission of a routing session management (SM) message, which is similar to transparent transmission proxy; (10) access authentication; (11) access authorization; (12) forwarding an SMS message (short message service message) between the UE and a short message service function SMSF; (13) interacting with the AUSF and UE to obtain a UE authentication intermediate key; and (14) calculating a key for accessing a network.

SMF: The SMF is mainly configured to manage a session, assign and manage an internet protocol (IP) address of the UE, select a user plane function that may be managed, serve as a termination point of policy control and a charging function interface, notify downlink data, and the like. Main functions of the SMF include: (1) session management and session establishment, modification, and release, including maintaining a channel between a UPF node and an AN node; (2) UE IP address assignment and management; (3) selecting and controlling the user plane function; (4) configuring correct service routing on the UPF; (5) implementing the policy control function; (6) policy enforcement and QoS control; (7) lawful interception; (8) processing session management in a NAS message; (9) downlink data indication; (10) initiating session management information of an access network (routing via the AMF); (11) determining a session and service continuity mode; and (12) a roaming function.

PCF: The PCF is mainly configured to: provide the UE, the AMF, or the SMF with parameters related to a UE policy rule, an access management (AM) policy rule, and an SM policy rule, manage user subscription information, interwork with the UDM to access subscriber information related to policy decision, and so on. The PCF usually performs policy decision based on the subscription information and the like.

AF: The AF is configured to provide a service and is mainly configured to: (1) affect service routing; (2) expose a network access capability; and (3) interact with a policy framework to perform policy management and control.

UPF: The UPF is mainly responsible for packet routing and transfer, quality of service (QoS) control of user plane data, charging information statistics, and the like. The UPF may receive downlink data from the AF, and then transmit the downlink data to the UE through the (R)AN.

NEF: The NEF is mainly configured to connect a core network element to an external application server, and provide services such as authentication and data transfer when the external application server initiates a service request to a core network.

UDM: The UDM is mainly configured to manage subscription data and authentication data of a user, and perform authentication credit processing, user identity processing, access authorization, registration/mobility management, subscription management, short message service message management, and the like.

In some embodiments, the UDM may further include a unified data repository (UDR). Alternatively, in some other embodiments, a 3GPP SBA in the 5G system may further include a UDR. The UDR is configured to: store and retrieve a PCF policy, store and retrieve structured data for exposure, store user information requested by the application function, and so on.

In addition, for descriptions of functions of the DN, the AUSF, the NSSF, and the NRF, refer to explanations and descriptions in a conventional technology. Details are not described herein again.

Remote UE/relay UE: The remote UE/relay UE may be a desktop device, a laptop device, a handheld device, a wearable device, a smart home device, a computing device, a vehicle-mounted device, and the like having a wireless connection function, for example, a netbook, a tablet computer, a smartwatch, an ultra-mobile personal computer (UMPC), a smart camera, a personal digital assistant (PDA), a portable multimedia player (PMP), an AR (augmented reality)/VR (virtual reality) device, a wireless device on a flight vehicle, a wireless device on a robot, a wireless device in industrial control, a wireless device in telemedicine, a wireless device in a smart grid, a wireless device in a smart city, and a wireless device in a smart home. Alternatively, the UE may be a wireless device in a narrow band (NB) technology, or the like.

In addition, the remote UE/relay UE may alternatively refer to an access terminal, a subscriber unit, a subscriber station, a mobile station, a relay station, a remote station, a remote terminal, a mobile device, a user terminal, a terminal, a wireless communication device, a user agent, or a user apparatus. The remote UE/relay UE may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in the future evolved public land mobile network (PLMN), a terminal device in a future internet of vehicles.

In addition, the remote UE/relay UE may alternatively be a terminal device in an IoT system. An IoT is an important component of future information technology development. A main technical feature of the IoT is connecting a thing to a network by using a communication technology, to implement an intelligent network for interconnection between a person and a machine or between things. An IoT technology may implement massive connections, deep coverage, and terminal power saving by using, for example, the narrow band (NB) technology.

In addition, in this application, the relay UE may alternatively be a radio access device. For example, the relay UE may be an access device that is deployed by an operator and that is similar to a router. Types, structures, and the like of the remote UE and the relay UE are not limited in this application.

Figure 3:
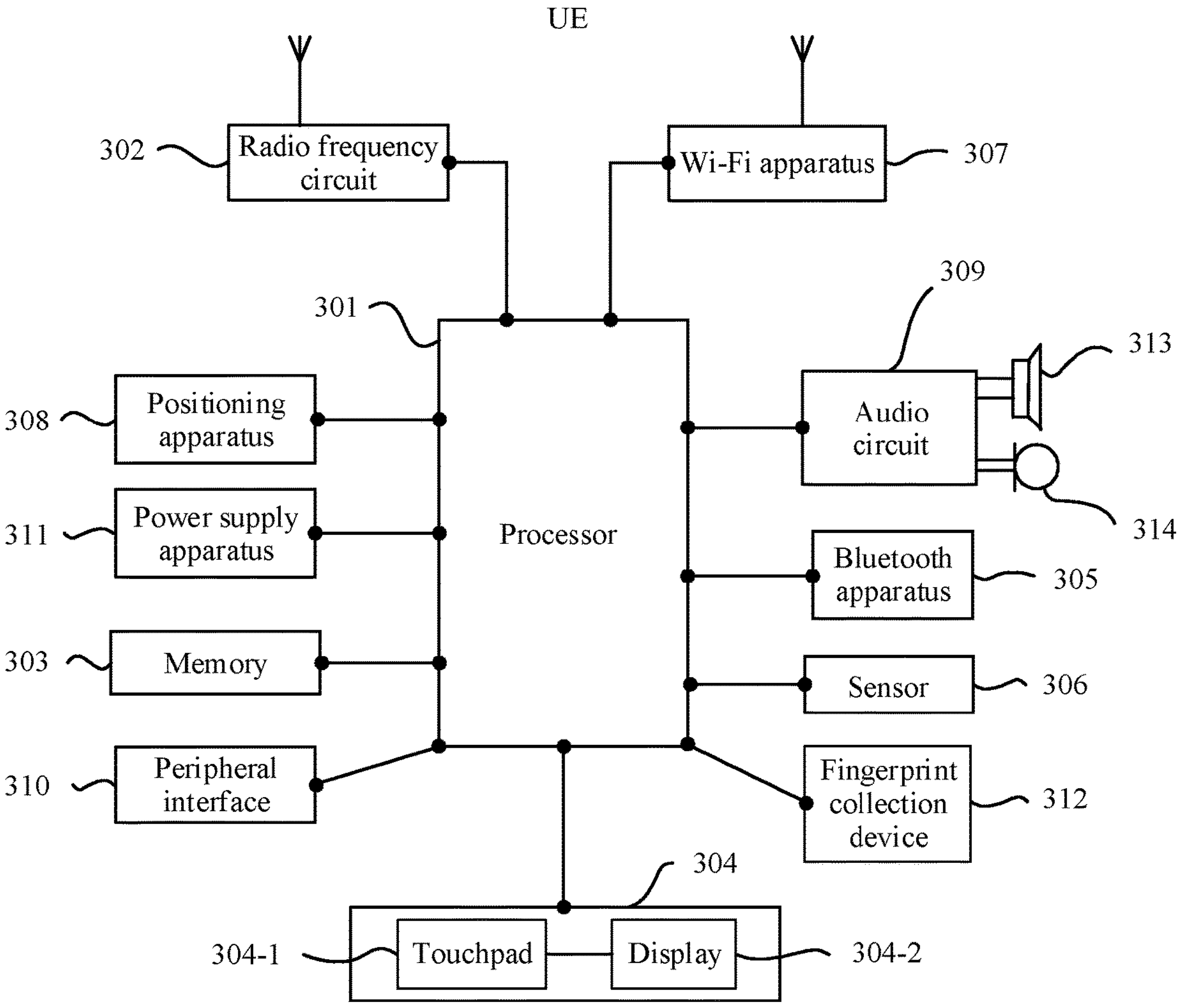
FIG. 3 is a diagram of a UE according to an embodiment of this application.

FIG. 3 is a diagram of a UE. The UE may be remote UE, or may be relay UE. As shown in FIG. 3, the UE may include components such as a processor 301, a radio frequency circuit 302, a memory 303, a touchscreen 304, a Bluetooth apparatus 305, one or more sensors 306, a Wi-Fi apparatus 307, a positioning apparatus 308, an audio circuit 309, a peripheral interface 310, a power supply apparatus 311, a fingerprint collection device 312, a speaker 313, and a microphone 314. The components may perform communication through one or more communication buses or signal lines (not shown in FIG. 3). A person skilled in the art may understand that the hardware structure shown in FIG. 3 does not constitute a limitation on the relay UE or the remote UE. The relay UE or the remote UE may include components more or fewer than those shown in the figure, may combine some components, or may have different component arrangements.

The components of the UE are described below with reference to FIG. 3.

The processor 301 may be a control center of the UE, is connected to other parts of the UE by using various interfaces and lines, and executes various functions of the UE by running or executing a computer program, for example, an application client-side program (which may be referred to as App for short below), stored in the memory 303.

In some embodiments, the processor 301 may be a general purpose central processing unit (CPU), a microprocessor, an application-specific integrated circuit (ASIC), or one or more integrated circuits configured to control program execution of the solutions in this application. The processor 301 may include one or more CPUs. For example, the processor 301 may be a Kirin chip.

The radio frequency circuit 302 may be configured to receive and send a radio signal. Particularly, the radio frequency circuit 302 may receive downlink data of a base station, and send the downlink data to the processor 301 for processing. In addition, the radio frequency circuit 302 may further send uplink data to the base station.

The radio frequency circuit 302 usually includes but is not limited to an antenna, at least one amplifier, a transceiver, a coupler, a low noise amplifier, a duplexer, and the like. In addition, the radio frequency circuit 302 may further communicate with another device through wireless communication. Any communication standard or protocol may be used for the wireless communication, and includes but is not limited to a global system for mobile communications, a general packet radio service, code division multiple access, wideband code division multiple access, long term evolution, an e-mail message, a short message service message service, and the like.

The memory 303 is configured to store the computer program, and may further be configured to store data. The memory 303 may be a read-only memory (ROM) or a random access memory (RAM), or may be an electrically erasable programmable read-only memory (EEPROM), a compact disc read-only memory (CD-ROM) or another compact disc storage device, an optical disc storage device (including a compact disc, a laser disc, an optical disc, a digital versatile disc, a Blu-ray disc, or the like), a magnetic disk storage medium or another magnetic storage device, or any other medium that can be for carrying or storing program code and that can be accessed by a computer, but is not limited thereto.

The processor 301 may execute the various functions of the UE and perform data processing by running the computer program stored in the memory 303.

The memory 303 may include a program storage area and a data storage area. The program storage area may store an operating system and an application program required by at least one function (for example, a sound play function and an image play function). The data storage area may store data (for example, audio data and a phone book) created when the UE is used.

The memory 303 may store a computer program for implementing a modular function, and execution of the computer program is controlled by the processor 301. The processor 301 is configured to execute the computer program stored in the memory 303, to implement the methods provided in the following embodiments of this application. In addition, the memory 303 may include a high-speed random access memory, or may include a nonvolatile memory, for example, a magnetic disk storage device and a flash memory, another volatile solid-state storage device, or the like. The memory 303 may store various operating systems such as an iOS operating system and an Android operating system.

The UE may further include at least one or more sensors 306 such as a light sensor, a motion sensor, and another sensor. The light sensor may include an ambient light sensor and a proximity sensor. The ambient light sensor may adjust luminance of a display of the touchscreen 304 based on brightness of ambient light. The proximity sensor may switch off a power supply of the display when the UE is moved to an ear. As one type of the motion sensor, an accelerometer sensor may detect acceleration values in various directions (usually on three axes). The accelerometer sensor may detect a value and a direction of gravity when the UE is stationary, may identify a smartphone posture (for example, switching between a landscape mode and a portrait mode, a related game, and magnetometer posture calibration), and may be used for a function related to vibration recognition (such as a pedometer and tapping), and the like. For other sensors, for example, a gyroscope, a barometer, a hygrometer, a thermometer, and an infrared sensor, that may further be configured in the UE, details are not described herein.

The audio circuit 309, the speaker 313, and the microphone 314 may provide an audio interface between a user and the UE. The audio circuit 309 may transmit, to the speaker 313, a received electric signal obtained through audio data conversion, and the speaker 313 converts the electric signal into a sound signal for output. In addition, the microphone 314 converts a collected sound signal into an electric signal. The audio circuit 309 receives the electric signal, then converts the electric signal into audio data, and outputs the audio data to the radio frequency circuit 302 to send the audio data to, for example, another UE, or outputs the audio data to the memory 303 for further processing.

Although not shown in FIG. 3, the UE may further include a camera (a front-facing camera and/or a rear-facing camera), a flash, a micro projection apparatus, a near field communication (NFC) apparatus, and the like. Details are not described herein.

It should be understood that the hardware modules included in the UE shown in FIG. 3 are merely examples for description, and constitute no limitation on this application. Actually, the UE (for example, the remote UE or the relay UE) provided in this embodiment of this application may further include another hardware module that has an interaction relationship with the hardware modules shown in the figure. This is not specifically limited herein.

It should be noted that the AN/RAN device in this application may be a base station. The base station may be an ng-eNB, a gNB, or a transmission reception point (TRP), or may be a base station defined in 3GPP, for example, an eNB or an e-NodeB.

In addition, when the eNB accesses an NR core network, a next generation core (NGC), or a 5G core network (5th generation core network, 5GC), the eNB may also be referred to as an eLTE eNB. The eLTE eNB is an LTE base station device evolved based on the eNB, and may be directly connected to the 5G CN. The eLTE eNB also belongs to a base station device in NR.

Alternatively, the AN/RAN device may be a wireless terminal (WT), for example, an access point (AP), an access controller (AC), or another network device that has a capability of communicating with UE and a core network, for example, a vehicle-mounted device or an intelligent wearable device. A type of the AN/RAN device is not limited in this application.

Figure 1:
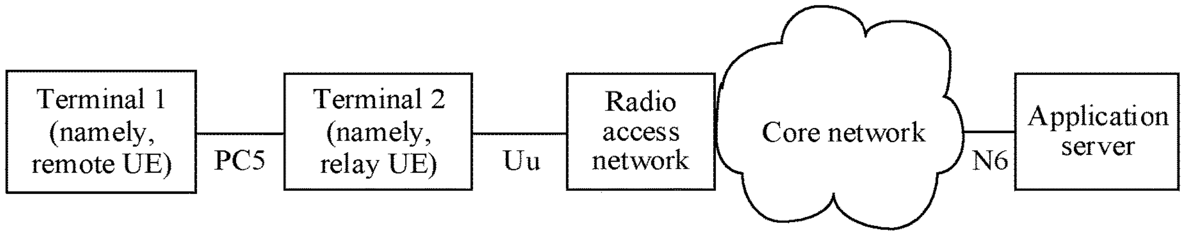
FIG. 1 is an example diagram of a ProSe architecture of a 5G communication system.
Figure 4:
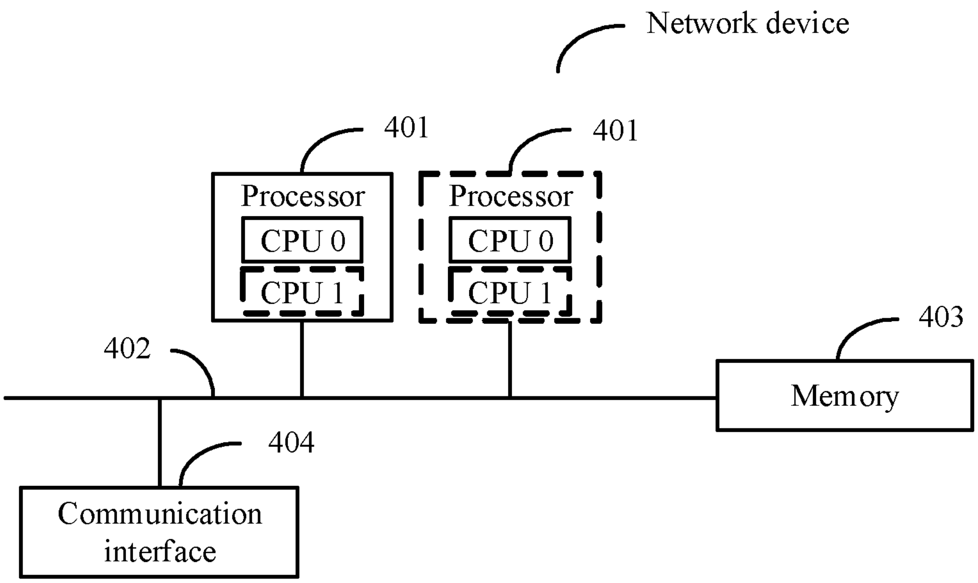
FIG. 4 is a diagram of a network device according to an embodiment of this application.

FIG. 4 is a diagram of a network device. The network device may be an AN/RAN device in a radio access network shown in FIG. 1, or the AN/RAN device in the AN/RAN shown in FIG. 2, or may be the core network element such as the AMF, the SMF, or the PCF shown in FIG. 2. As shown in FIG. 4, the network device may include a processor 401, a communication line 402, a memory 403, and at least one communication interface (where that the network device includes a communication interface 404 is merely used as an example for description in FIG. 4).

The processor 401 may include one or more processors. The processor may be a general purpose central processing unit (CPU), a microprocessor, an application-specific integrated circuit (ASIC), or another integrated circuit. This is not limited.

The communication line 402 may include a path for transmitting information between the foregoing components.

The communication interface 404 is configured to communicate with another device or a communication network The memory 403 may be a ROM, a RAM, an EEPROM, a CD-ROM or another compact disc storage device, an optical disc storage device (including a compact disc, a laser disc, an optical disc, a digital versatile disc, a Blu-ray disc, and the like), a magnetic disk storage medium or another magnetic storage device, or any other medium that can be for carrying or storing expected program code in a form of instructions or a data structure and that can be accessed by a computer. However, the memory 403 is not limited thereto.

It should be noted that the memory may exist alone, and is connected to the processor through the communication line 402. The memory may alternatively be integrated with the processor.

The memory 403 is configured to store a computer program. The processor 401 is configured to execute the computer program stored in the memory 403, to implement a method of a related network element provided in any one of the following method embodiments of this application.

It should be noted that the processor 401 may include one or more CPUs such as a CPU 0 and a CPU 1 in FIG. 4.

In addition, FIG. 4 is merely used as an example of the network device, and does not limit a specific structure of the network device. For example, the network device may further include another functional module.

Figure 5:
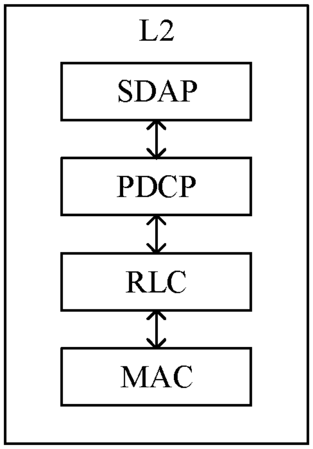
FIG. 5 is a diagram of data processing at a data link layer.

ProSe communication may be implemented by using an air interface protocol stack. The air interface protocol stack is usually divided into three layers: a physical layer (also referred to as a layer 1, L1 for short), a data link layer (also referred to as a layer 2, L2 for short), and a network layer (also referred to as a layer 3, L3 for short). As shown in FIG. 5, in a 5G new radio (NR) communication system, L2 may be further divided into the following sublayers: a medium access control (MAC) layer, a radio link control (RLC) layer, a packet data convergence protocol (PDCP) layer, and a service data adaptation protocol (SDAP) layer. The MAC layer is for providing a logical channel for the RLC layer, and performing mapping between the logical channel and a physical channel. The RLC layer is for providing an RLC channel for the PDCP layer, and performing mapping between the RLC channel and the logical channel. The PDCP layer is for providing a radio bearer (RB) for the SDAP layer, and performing mapping between the RB and the RLC channel. The RB includes a signaling radio bearer (SRB) of a control plane and a data radio bearer (DBR) of a user plane. The SDAP layer is for providing a specific quality of service flow (QoS flow) of a data packet, and performing mapping between the QoS flow and the RB. Data packets transmitted by using a same QoS flow are processed by using a same QoS parameter, and the same QoS flow is represented by using a QoS flow identifier (QFI). A QoS parameter indicates one or more of parameters such as a resource type, a priority, a delay, a packet loss rate, or a time window size required for data packet transmission.

Usually, the ProSe communication may be based on a layer 2 relay protocol stack or a layer 3 relay protocol stack. For the layer 2 relay protocol stack, refer to FIG. 6(*a*). For the layer 3 relay protocol stack, refer to FIG. 6(*b*).

Figure 6A:
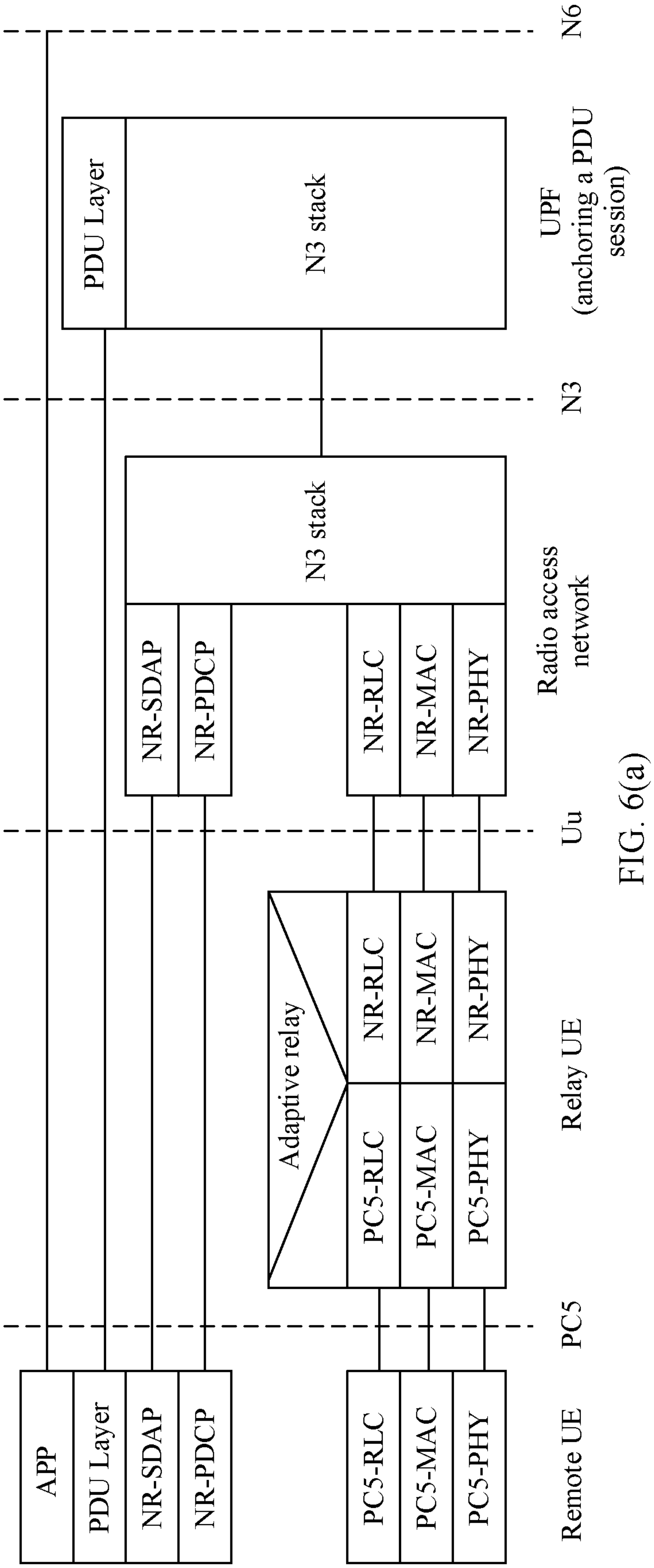
FIG. 6(*a*) and FIG. 6(*b*) are a diagram of two types of relay protocol stacks.
Figure 6B:
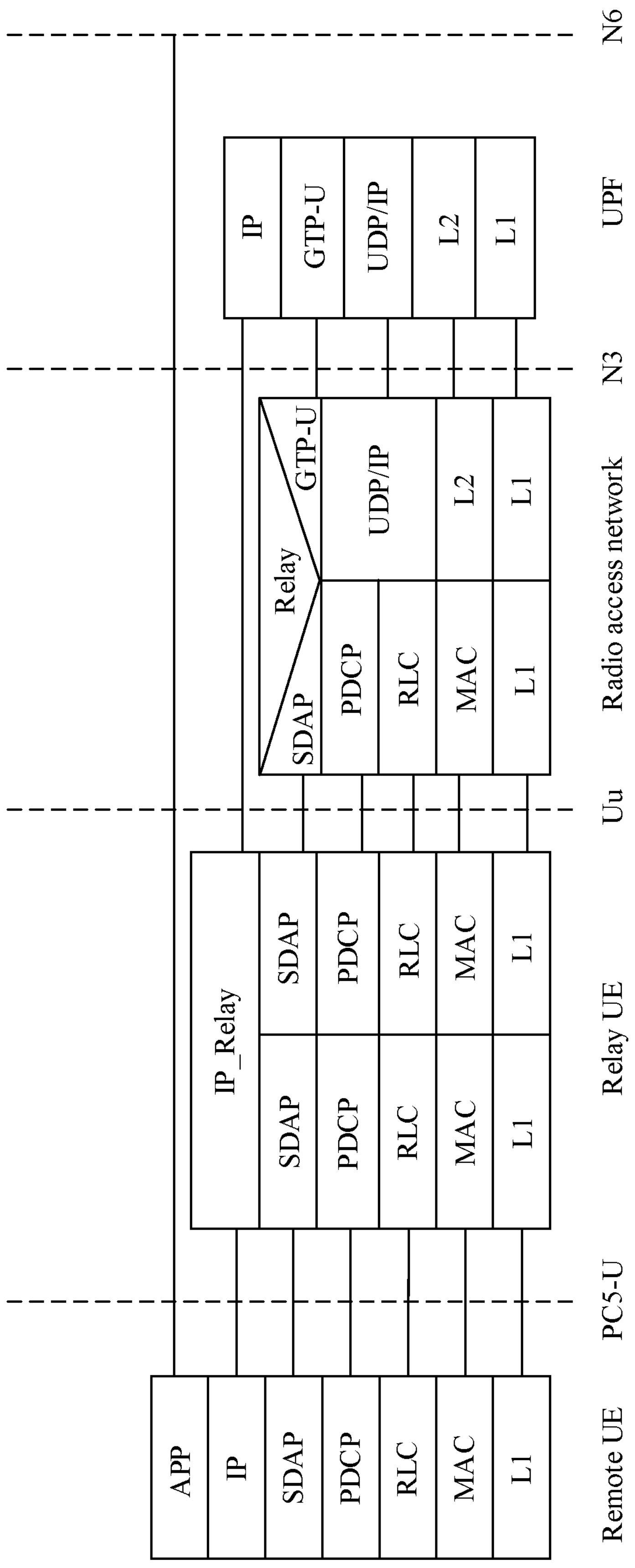

As shown in FIG. 6(*a*), when an application server needs to transmit service data, first, service data in a protocol data unit (PDU) is encapsulated once at an NR-SDAP layer of remote UE. Then, the NR-SDAP layer maps, based on a QoS requirement of application data, the service data to a bearer for physical layer transmission, and uses the determined bearer to transmit the service data by using an established PDU session. As shown in FIG. 6(*a*), the remote UE is directly connected to PDCP and SDAP of a radio access network. PC5-RLC of the remote UE and PC5-RLC of relay UE are correspondingly connected. NR-RLC of the relay UE and NR-RLC of the radio access network are correspondingly connected. However, a relay function of the relay UE can be performed only below the PDCP layer. Therefore, data security between the remote UE and the radio access network can be ensured when the remote UE connects to the network by using the layer 2 relay UE. However, if the remote UE does not mark service data transmitted via the relay UE, for example, mark that the service data is forwarded by the relay UE, a core network element (for example, a UPF network element, an SMF network element, or an AMF network element) does not know that a relay mode is used for the service data. Therefore, a network side cannot supervise the service data forwarded by the relay UE to the network.

As shown in FIG. 6(*b*), remote UE and layer 3 relay UE perform service data transmission through a PC5-U interface. After receiving application data from the remote UE, the relay UE decodes the application data at a layer 1 and a layer 2, and does not stop decoding until decoding occurs at an IP layer (where data within the IP layer is not decoded). Then, the relay UE packages IP data of the remote UE at the layer 2 and the layer 1 by using a protocol stack over the Uu interface, and sends the IP data to a UPF network element through the Uu interface via an access network device. The UPF network element sends a data packet to a corresponding application server based on routing information indicated by the data packet. In the foregoing process of transmitting service data, the UPF network element does not check or monitor service information. For example, the UPF network element does not check whether relay forwarding is allowed for the service data.

Therefore, regardless of whether conventional ProSe communication is based on the layer 2 relay protocol stack or the layer 3 relay protocol stack, the network side does not supervise the service data forwarded by relay UE to the network. This is unfavorable to service management performed by the network side on relay forwarding data, and even affects charging management performed by the network on the remote UE.

To resolve the foregoing problem, this application provides a proximity service communication method. Remote UE may send relay information to a core network element (for example, an SMF network element or an AMF network element), where the relay information indicates that the remote UE is to transmit a service in relay mode, so that the core network element can perform, based on the relay information, detecting, monitoring, or the like on service data of the remote UE forwarded by relay UE.

The proximity service communication method provided in embodiments of this application is described below with reference to the accompanying drawings.

Figure 7:
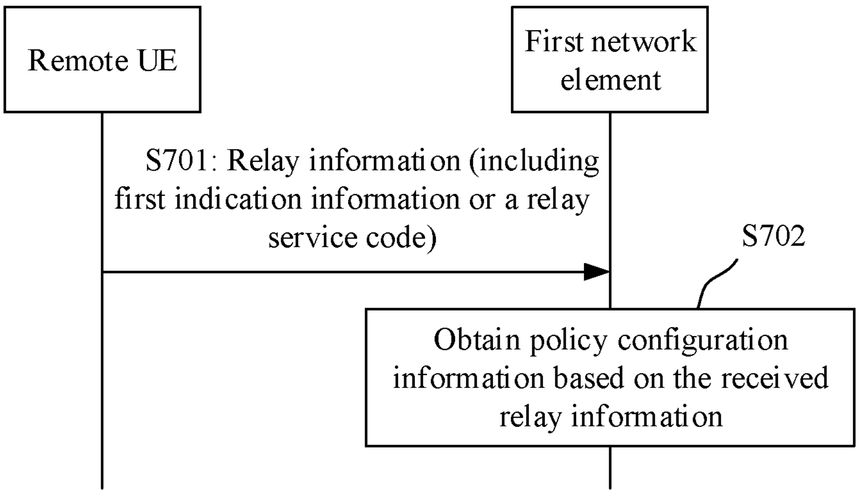
FIG. 7 is a flowchart 1 of a proximity service communication method according to an embodiment of this application.

As shown in FIG. 7, a proximity service communication method provided in an embodiment of this application may include the following steps S701 and S702.

S701: Remote UE sends relay information to a first network element.

The relay information includes first indication information or a relay service code (RSC). The first indication information indicates that the remote UE is to transmit a service in relay mode. For example, the service to be transmitted by the remote UE in relay mode is a service corresponding to an application identifier (APP ID) or a service corresponding to an application function identifier (AF ID). Alternatively, the service to be transmitted by the remote UE in relay mode may be a service of a slice/service type (SST).

Optionally, in an implementation, the RSC is an identifier code that is preconfigured by a core network element (for example, a PCF network element) for the remote UE and relay UE and that is for relay connection discovery. For example, the RSC may be preconfigured by a proximity service function (ProSe Function) for the remote UE and the relay UE. Alternatively, the ProSe function may be integrated into the PCF network element.

The RSC may be bound to service information to form a correspondence. For example, a first service may be bound to an RSC 1 to form a correspondence. In this case, if the remote UE sends the RSC 1 to the first network element when having a requirement of transmitting the first service, the first network element may check, based on the correspondence between the RSC and the service information, whether the remote UE can transmit the first service via the relay UE, and obtain policy configuration information when determining that the remote UE can transmit the first service via the relay UE, to monitor service data transmitted by the relay UE. This part will be described in detail below.

In this application, the first network element may be an SMF network element, an AMF network element, or another core network element having a policy configuration function, a service monitoring function, or the like. The first network element is not specifically limited in this embodiment of this application.

The relay information may be carried in a message such as a PDU session establishment request message, a PDU session modification request message, or a non-access stratum NAS message.

S702: The first network element obtains the policy configuration information based on the received relay information.

When the relay information includes the first indication information, the policy configuration information includes information about a service that the remote UE is allowed to transmit in relay mode.

For example, when the first network element is the AMF network element, and the relay information includes the first indication information, the policy configuration information may include user policy information (for example, a UE policy) or access management policy information (for example, an access management (AM) policy) of the service to be transmitted by the remote UE in relay mode.

The UE policy may include subscription information of the remote UE, for example, information about a slice to which the remote UE subscribes and information about a service to which the remote UE subscribes and that may be transmitted in relay mode. The UE policy may further include capability information of the remote UE, for example, information about a communication interface supported by the remote UE (where for example, the remote UE supports PC5 interface communication). The AM policy may include information about a service area in which the remote UE may access a network, information about a slice that may be used by the remote UE, the information about the service that the remote UE may transmit in relay mode, a rule of selecting an SMF network element, and the like.

When the policy configuration information includes the UE policy of the service to be transmitted by the remote UE in relay mode, according to the UE policy, the AMF network element may obtain the subscription information of the remote UE in the network, for example, the information about the slice to which the remote UE subscribes and the information about the service to which the remote UE subscribes and that may be transmitted in relay mode, and check, with reference to the information about the communication interface supported by the remote UE, whether the remote UE is allowed to transmit the first service of the remote UE in relay mode.

When the policy configuration information includes the AM policy of the service to be transmitted by the remote UE in relay mode, according to the AM policy, the AMF network element may limit access of the remote UE to the network (for example, in terms of a location of the remote UE or a used PLMN), select the SMF network element for the remote UE, and so on. In addition, according to the AM policy, the AMF network element may obtain the information about the slice that may be used by the remote UE, the information about the service that the remote UE may transmit in relay mode, and check whether the remote UE is allowed to transmit the first service of the remote UE in relay mode.

In this case, if the AMF network element may determine, based on the policy configuration information, that the remote UE is allowed to transmit the first service of the remote UE in relay mode, the AMF network element sends, to the SMF network element, a request message requesting to establish or modify a PDU session of the remote UE. Alternatively, if the AMF network element determines, based on the policy configuration information, that the remote UE is not allowed to transmit the first service in relay mode, the AMF network element sends, to the remote UE, indication information indicating rejection of transmitting the first service by the remote UE in relay mode, and the AMF network element terminates establishment or modification of a PDU session.

When the first network element is the SMF network element, and the relay information includes the first indication information, the policy configuration information may include one or more of the following information of the service that the remote UE is allowed to transmit in relay mode: a packet detection rule (PDR), a forwarding action rule (FAR), or a multi-access rule (MAR).

The PDR may include a rule for distinguishing between data packets, for example, core network tunnel information (CN tunnel info), a QFI, a data packet filter set (IP packet filter set), or an APP ID. The data packet filter set (IP packet filter set) may include a source IP address, a destination IP address, or the like. Optionally, the PDR may further include processing rules, for example, the FAR and the MAR, for a data packet obtained through distinguishing. The FAR may include a rule used by a UPF network element to transmit the data packet, for example, transfer operation information (for example, forwarding, duplication, discarding, or buffering) and transfer target information (for example, to an access side (that is, over a downlink), a core network side (that is, over an uplink), the SMF network element, or a DN). The MAR may include a data packet distribution rule, for example, a data packet offloading and converging rule, used when the remote UE accesses a network through a plurality of interfaces (for example, a 3GPP interface and a non-3GPP interface). In this embodiment of this application, the PDR may be understood as a data packet monitoring rule. The SMF network element may configure, for the UPF network element, a PDR corresponding to the first service. The UPF network element may identify a data packet of the first service according to the PDR, and transmit data of the first service according to a corresponding FAR. However, the UPF network element may directly discard a data packet for which no PDR is configured.

In this case, the SMF network element may send the policy configuration information to the UPF network element, so that the UPF network element monitors, based on the policy configuration information, the service data transmitted by the relay UE. For example, the policy configuration information may include a PDR and an FAR of a service that can be transmitted in relay mode. According to the PDR and the FAR, the UPF network element may determine not to accept forwarding some services of the remote UE by the relay UE, and filter out service data that cannot be transmitted in relay mode.

When the relay information includes the relay service code, the policy configuration information may include information about a service corresponding to the relay service code.

For example, when the first network element is the AMF network element, and the relay information includes the relay service code, the policy configuration information may include user policy information or access management policy information of the service corresponding to the relay service code. In this case, the AMF network element may determine, based on the policy configuration information including, for example, an RSC (for example, the RSC 1) corresponding to the first service, that the remote UE is allowed to transmit, in relay mode, service data of a service (namely, the first service) that is of the remote UE and that corresponds to the RSC 1. In addition, the AMF network element sends, to an SMF network element, a request message requesting to establish or modify a PDU session of the remote UE. Alternatively, if the AMF network element determines, based on the policy configuration information including, for example, an RSC corresponding to a service other than the first service, that the remote UE is not allowed to transmit the first service in relay mode, the AMF network element sends, to the remote UE, indication information indicating rejection of transmitting the first service by the remote UE in relay mode.

When the first network element is the SMF network element, and the relay information includes the relay service code, the policy configuration information may include one or more of the following information of the service corresponding to the relay service code: a PDR, an FAR, or an MAR. In this case, the SMF network element may send the policy configuration information to a UPF network element, so that the UPF network element monitors, based on the policy configuration information, the service data transmitted by the relay UE. For example, the policy configuration information includes a PDR and an FAR of the first service corresponding to the RSC 1. The UPF network element may determine, according to the PDR and the FAR, not to provide the remote UE with a relay service of a service other than the first service, and filter out service data that cannot be transmitted in relay mode.

In an example, if the relay information includes the first indication information, step S702 may include: The first network element obtains the policy configuration information from the PCF network element based on the received first indication information. First, the first network element may determine, based on the received first indication information, a service that can be transmitted in relay mode. Then, the first network element may obtain, from the PCF network element, policy configuration information of the service that can be transmitted in relay mode.

In another example, if the relay information includes the relay service code, for example, the relay information includes the RSC 1, step S702 may include: First, the first network element determines a service (for example, the first service) corresponding to the RSC 1. For example, the first network element obtains, from an AF network element, the service corresponding to the RSC 1; the first network element directly obtains, from a UDM network element or a UDR network element, the service corresponding to the RSC 1; or the first network element obtains, from a UDM network element or a UDR network element via the PCF network element, the service corresponding to the RSC 1. Then, the first network element obtains, from the PCF network element, a PCC rule of the service (for example, the first service) corresponding to the RSC 1. For example, the first network element sends a PCC rule request message to the PCF network element, where the PCC rule request message carries identification information of the first service, and the PCC rule request message requests the PCC rule of the first service. Finally, the first network element determines the policy configuration information according to the obtained PCC rule. The PCC rule of the first service may usually include three types of information: service data flow detection information, policy control information, and charging-related information. For content of the PCC rule, refer to explanations and descriptions in a conventional technology. Details are not described herein again.

Alternatively, in another example, step S702 may include: First, the first network element sends a PCC rule request message to the PCF network element, where the PCC rule request message carries the RSC 1, and the PCC rule request message requests a PCC rule of a service corresponding to the RSC 1. Then, the first network element receives, from the PCF network element, the PCC rule of the service corresponding to the RSC 1. Finally, the first network element determines the policy configuration information according to the received PCC rule.

Alternatively, in another example, step S702 may include: First, the first network element sends a PCC rule request message to the PCF network element, where the PCC rule request message carries the RSC 1 and identification information of the remote UE (for example, an ID of the remote UE). Then, the first network element receives, from the PCF network element, a PCC rule of a service to which the remote UE subscribes and that corresponds to the RSC 1. Finally, the first network element determines the policy configuration information according to the received PCC rule.

Figure 8:
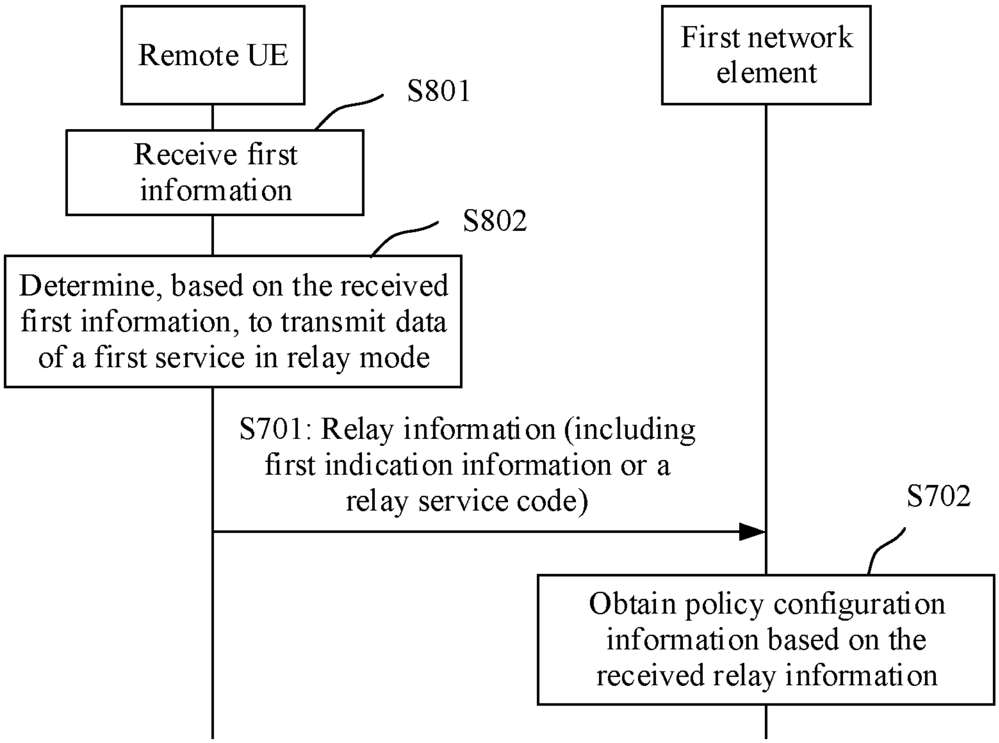
FIG. 8 is a flowchart 2 of a proximity service communication method according to an embodiment of this application.

Further, as shown in FIG. 8, before step S701 is performed, a proximity service communication method provided in an embodiment of this application may further include steps S801 and S802.

S801: The remote UE receives first information.

The first information is for representing a service that the remote UE is allowed to transmit in relay mode.

In some embodiments, the first information may include one or more of the following service information: a data network name (DNN), single network slice selection assistance information (S-NSSAI), an APP ID, or an AF ID (or an AF-Service-Identifier).

The DNN identifies a data network provided by a mobile operator. The DNN usually includes a DNN network identifier and a DNN operator identifier. For example, the DNN may be for representing a data network of a subscribed operator, a virtual local area network, an emergency service, or the like that is used for the service that the remote UE is allowed to transmit in relay mode.

The S-NSSAI uniquely identifies a network slice. The network slice is for resolving the following problem: Because requirements of services on a network function, connection performance, security, and the like are greatly different, it is quite difficult to simultaneously satisfy requirements such as high bandwidth, a low delay, and high reliability when a single network is for carrying the services. The network slice may provide a customized network service for a user. Through flexible allocation of network resources and on-demand networking, a plurality of logical subnets (that is, slices) having different features and isolated from each other are virtualized on a same physical infrastructure to provide a service for the user in a targeted manner. A plurality of network slices isolated from each other may be virtualized based on the user plane network element and the control plane network element, for example, the PCF network element, the NRF network element, the SMF network element, and the UPF network element, shown in FIG. 2. Each slice may include user equipment, an access network device (for example, a base station), and a plurality of network slices virtualized by a core network element. Different slices may be used as channels independent of each other, to serve services that have different requirements on mobility, charging, security, policy control, a delay, reliability, and the like. For detailed descriptions of the network slice, refer to explanations and descriptions in a conventional technology. In this embodiment of this application, when the first information includes the S-NSSAI, the remote UE may determine, based on the first information, a slice-type service that the remote UE is allowed to transmit in relay mode. The APP ID uniquely identifies an application. In this embodiment of this application, when the first information includes the APP ID, the remote UE may determine, based on the first information, an application to which the service that the remote UE is allowed to transmit in relay mode belongs, for example, a WeChat application, a Tencent meeting application, or a microblog application. The AF ID identifies an application server that provides a service.

It should be noted that the first information may include more than one of the DNN, the S-NSSAI, the APP ID, or the AF ID (or the AF-Service-Identifier). For example, the first information may include a combination of the DNN and the S-NSSAI. The combination of the DNN and the S-NSSAI represents information about an operator slice service used by the remote UE. The AF ID or the AF-Service-Identifier may represent a service, or may be mapped, via a core network element, to the operator slice service corresponding to the combination of the DNN and the S-NSSAI.

In this embodiment of this application, the first information may be in a form of a list, and a list head of the list is first indication information, as shown in Table 1 below.

TABLE 1

| First indication information | APP ID |
|---|---|
| | 1 |
| | 2 |
| | 3 |

In some other embodiments, the first information may include a correspondence between a relay service code and service information.

The service information includes at least one of the following: a service type, a service identifier (for example, an AF ID or an AF-Service-Identifier), or an APP ID. The service type may be represented by using a DNN and/or S-NSSAI.

In this embodiment of this application, the first information may be in a form of a list. For example, the list includes one or more correspondences between the relay service codes and the service information, as shown in Table 2 below.

TABLE 2

| RSC | APP ID |
|---|---|
| RSC 1 | 1 |
| | 2 |
| RSC 2 | 3 |
| RSC 3 | 4 |
| | 5 |
| | 6 |

In an example, step S801 may include: The remote UE receives the first information from a second network element (for example, a PCF network element or an AF network element), where the first information may be stored in the second network element (for example, the PCF network element or the AF network element). Alternatively, the first information may be stored in a UDM network element or a UDR network element, and the remote UE may obtain the first information from the UDM network element or the UDR network element via a second network element (for example, a PCF network element or an AF network element).

In another example, step S801 may include: The remote UE receives the first information from an application server of a first service. The first information is stored in the application server of the first service.

S802: The remote UE determines, based on the received first information, to transmit data of the first service in relay mode.

When the first information includes one or more of the DNN, the S-NSSAI, the APP ID, or the AF ID, if the remote UE has a requirement of transmitting the first service, the remote UE may determine, by querying whether the DNN, the S-NSSAI, the APP ID, or the AF ID in the first information corresponds to the first service, whether to transmit the data of the first service in relay mode. For example, if the first service corresponds to one of the DNN, the S-NSSAI, the APP ID, or the AF ID in the first information, the remote UE determines to transmit the data of the first service in relay mode. If the first service corresponds to neither of the DNN, the S-NSSAI, the APP ID, and the AF ID in the first information, the remote UE determines not to transmit the data of the first service in relay mode.

When the first information includes the correspondence between the relay service code and the service information, if the remote UE has a requirement of transmitting the first service, the remote UE may determine, by querying whether service information of the first service is in the service information in the correspondence, whether to transmit the data of the first service in relay mode. For example, if the service information of the first service is in the service information in the foregoing correspondence, the remote UE determines to transmit the data of the first service in relay mode. If the service information of the first service is not in the service information in the correspondence, the remote UE determines not to transmit the data of the first service in relay mode.

Figure 9:
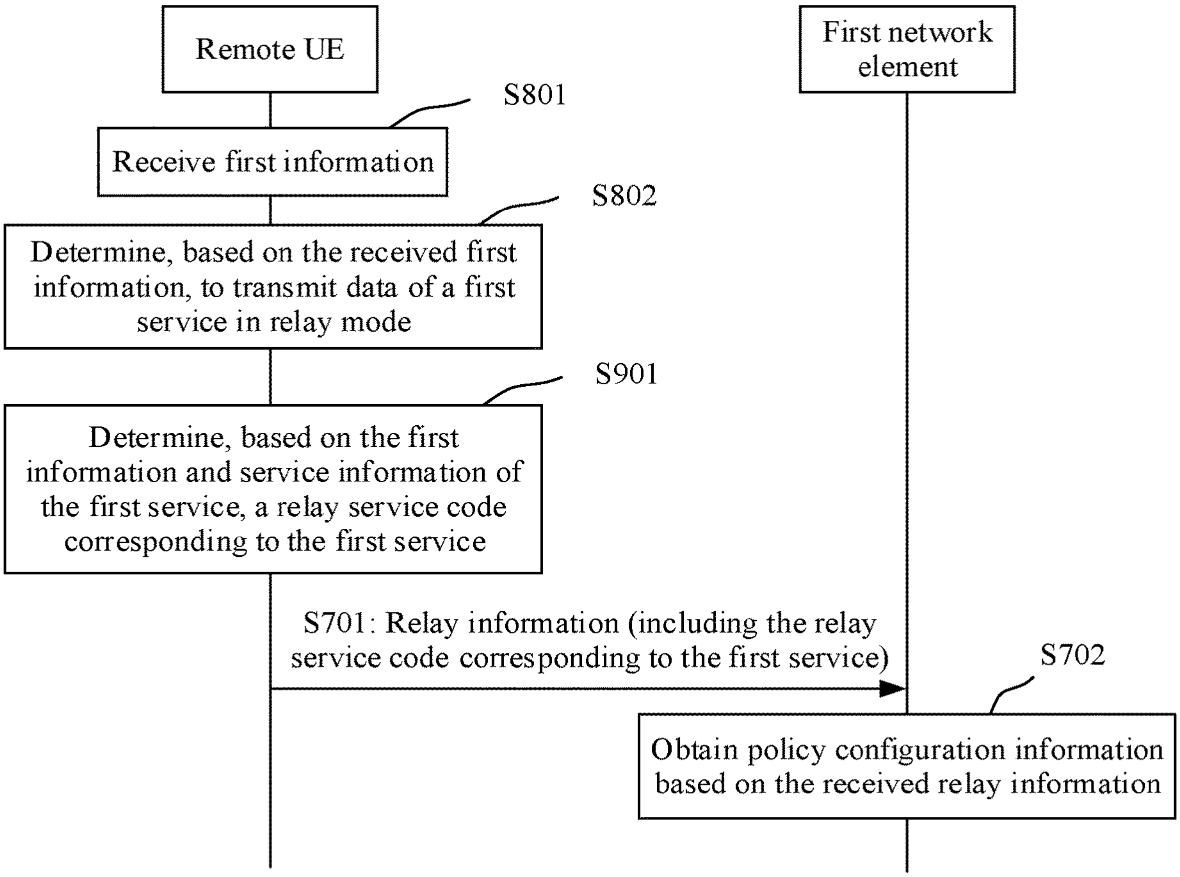
FIG. 9 is a flowchart 3 of a proximity service communication method according to an embodiment of this application.

When first information includes a correspondence between a relay service code and service information, as shown in FIG. 9, a proximity service communication method provided in an embodiment of this application may further include step S901.

S901: The remote UE determines, based on the first information and service information of a first service, a relay service code corresponding to the first service.

The remote UE may find, from the correspondence between the relay service code and the service information, the relay service code corresponding to the service information of the first service. The service information of the first service may include a service type, a service identifier, or an APP ID of the first service.

When the first information includes the correspondence between the relay service code and the service information, and the remote UE performs step S901, the relay information sent by the remote UE to the first network element in step S701 may include the relay service code corresponding to the first service, as shown in FIG. 9.

Implementation processes of a proximity service communication method provided in embodiments of this application are described in detail below with reference to embodiments shown in FIG. 11A, FIG. 11B, and FIG. 11C, FIG. 12A and FIG. 12B, FIG. 13A, FIG. 13B, and FIG. 13C, and FIG. 14A, FIG. 14B, and FIG. 14C.

Figure 11A:
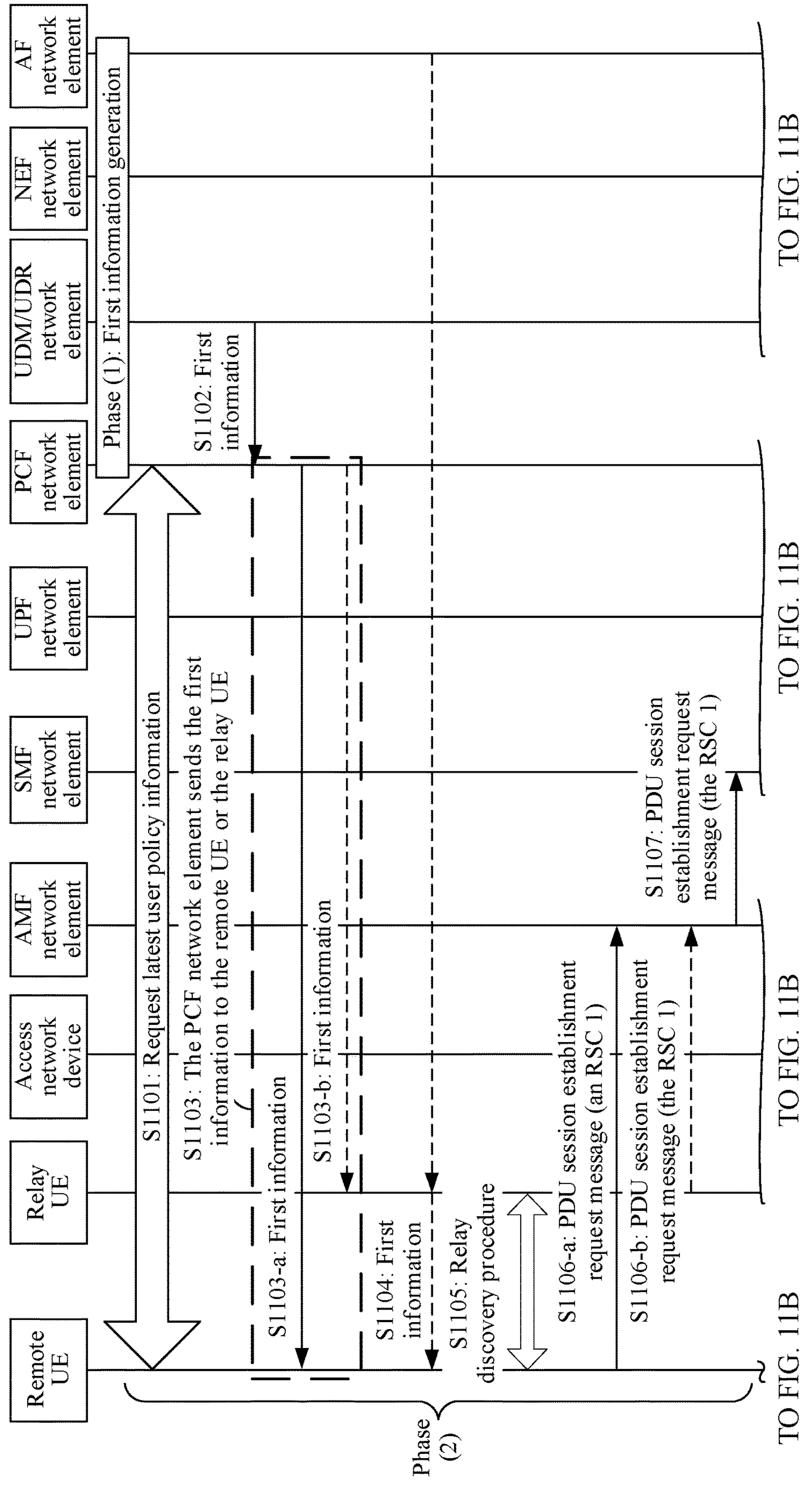
FIG. 11A, FIG. 11B, and FIG. 11C are a diagram 1 of interaction in a proximity service communication method according to an embodiment of this application.
Figure 11B:
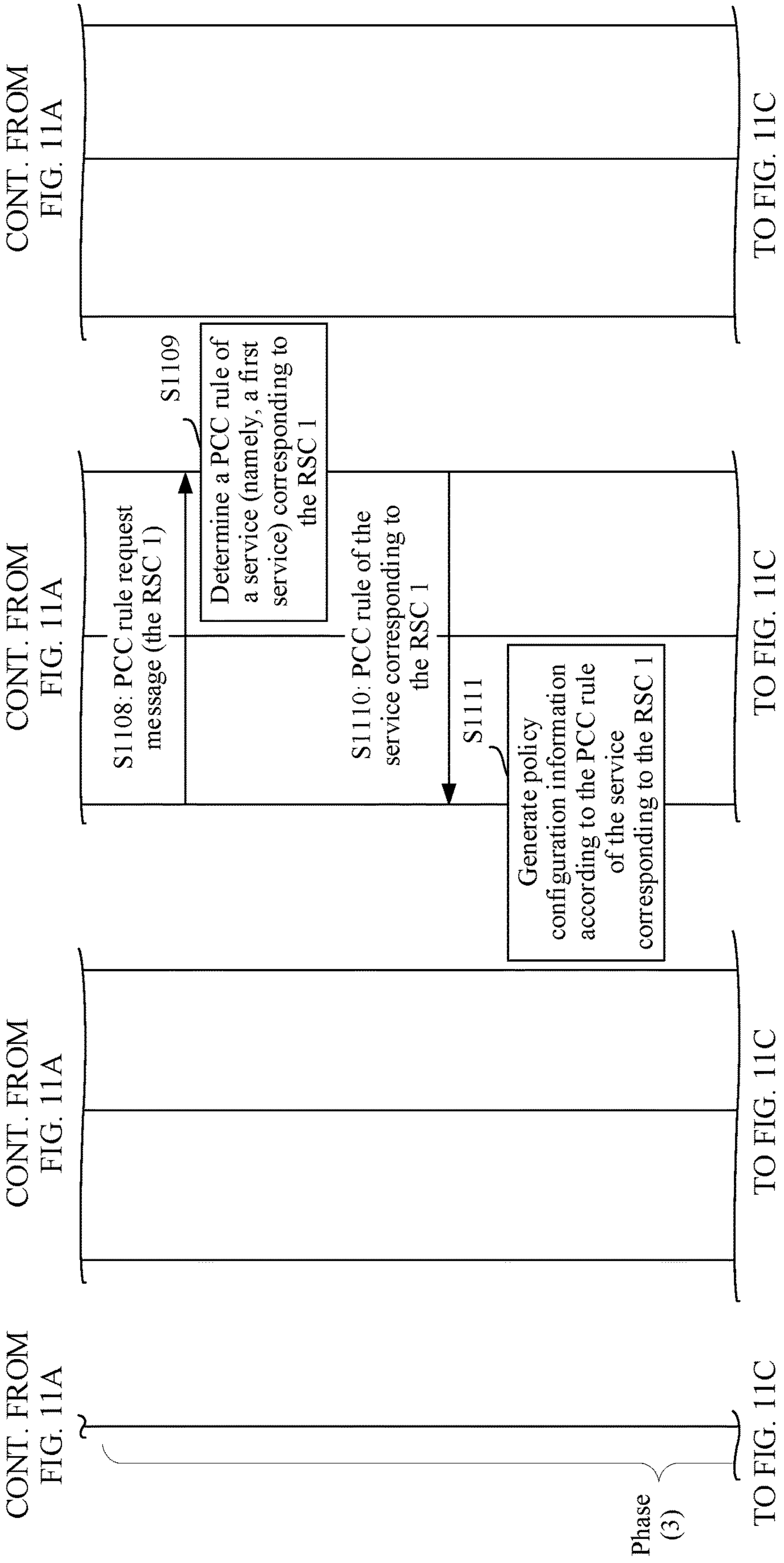
Figure 11C:
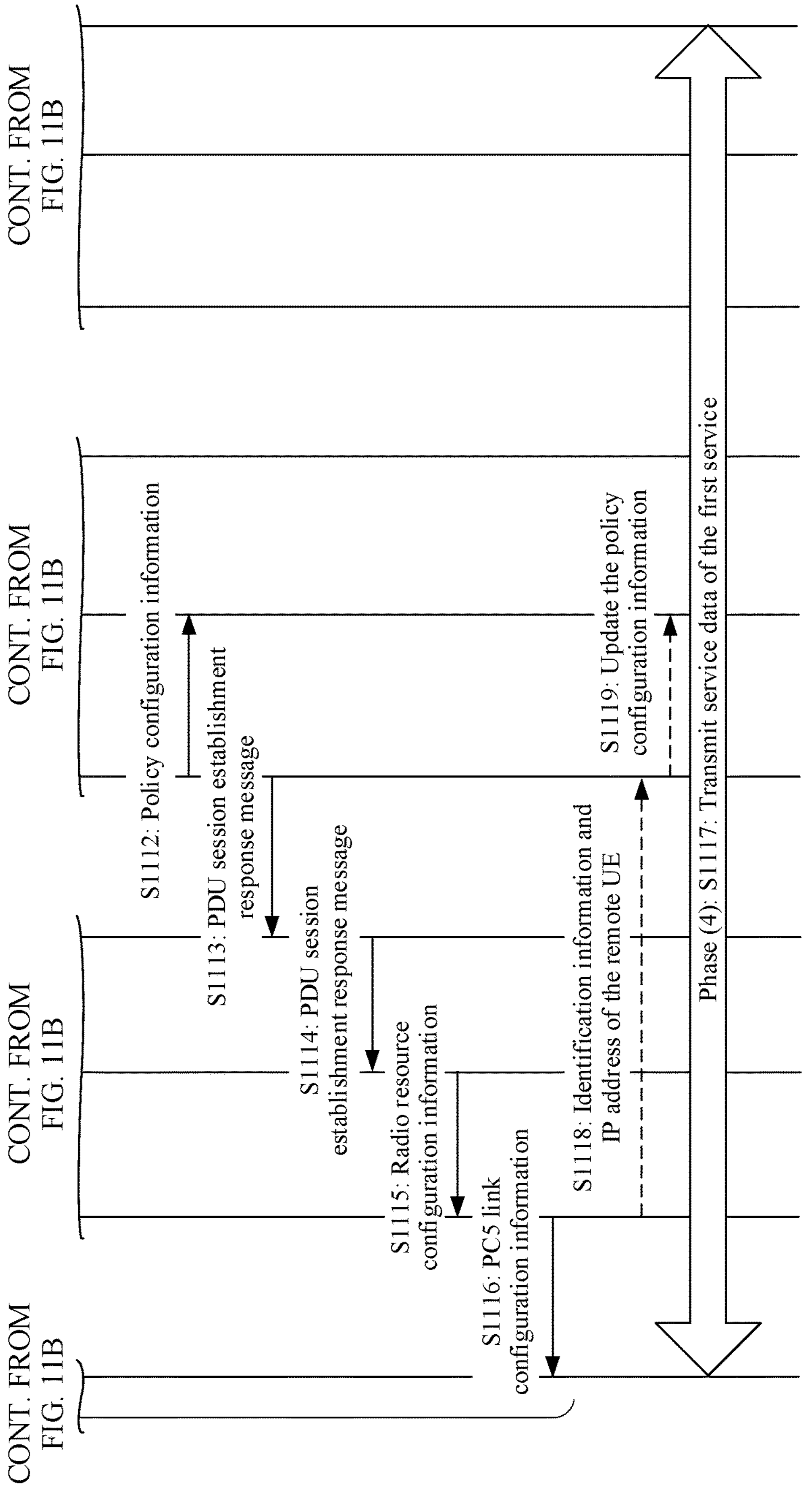

In the embodiment shown in FIG. 11A, FIG. 11B, and FIG. 11C, a first network element is an SMF network element. Relay information sent by remote UE to the first network element (namely, the SMF network element) includes a relay service code. The remote UE may send the relay service code, for example, an RSC 1, to the SMF network element when having a requirement of transmitting data of a first service. The RSC 1 is a relay service code corresponding to the first service. The remote UE sends, to the SMF network element, the relay service code corresponding to the first service, so that the SMF network element obtains policy configuration information, to monitor the first service transmitted by relay UE, perform related charging, and so on.

A proximity service communication method provided in this embodiment of this application may include the following four phases: a phase (1): a first-information generation phase; a phase (2): a relay information determining phase; a phase (3): a policy configuration information obtaining phase; and a phase (4): a data transmission and network monitoring phase.

Figure 10A:
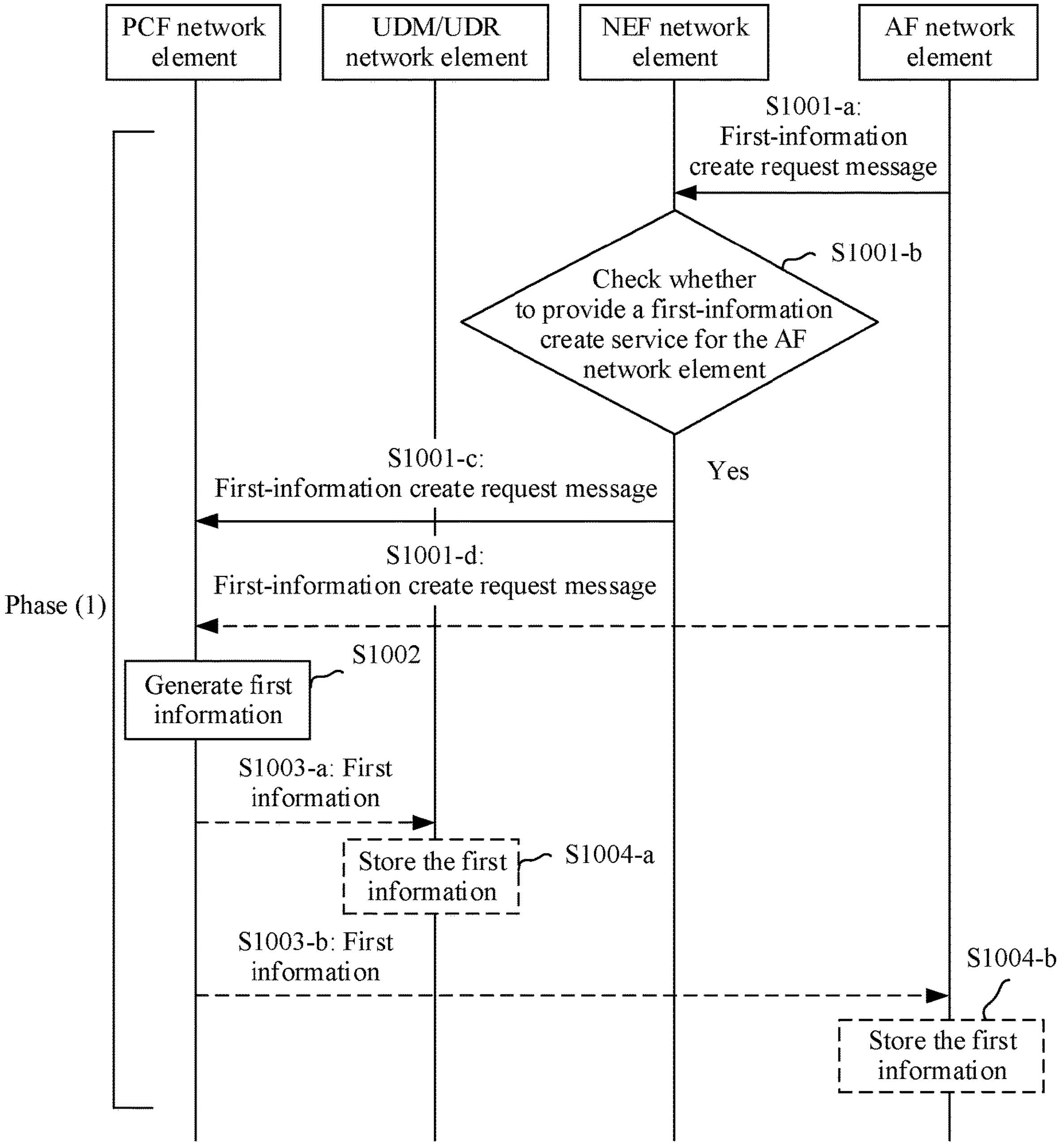
FIG. 10(*a*) and FIG. 10(*b*) are a diagram of interaction in two methods for generating first information according to an embodiment of this application.
Figure 10B:
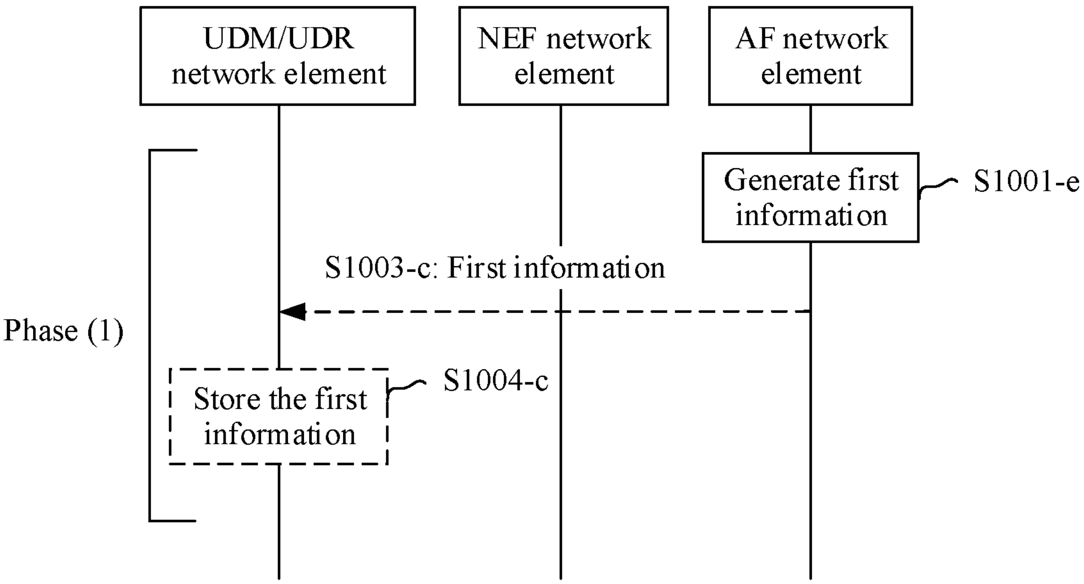

As shown in FIG. 10(*a*), the phase (1) may include the following steps S1001-*a*, S1001-*b*, S1001-*c*, and S1002. Alternatively, the phase (1) may include the following steps S1001-*a*, S1001-*b*, S1001-*c*, S1002, S1003-*a*, and S1004-*a*.

Alternatively, the phase (1) may include the following steps S1001-*a*, S1001-*b*, S1001-*c*, S1002, S1003-*b*, and S1004-*b*. Alternatively, the phase (1) may include the following steps S1001-*d* and S1002. Alternatively, the phase (1) may include the following steps S1001-*d*, S1002, S1003-*a*, and S1004-*a*. Alternatively, the phase (1) may include the following steps S1001-*d*, S1002, S1003-*b*, and S1004-*b*. Alternatively, as shown in FIG. 10(*b*), the phase (1) may include the following step S1001-*e*. Alternatively, the phase (1) may include the following steps S1001-*e*, S1003-*c*, and S1004-*c*. Details are as follows.

S1001-*a*: An AF network element sends a first-information create request message to an NEF network element.

The first-information create request message carries service information. The service information includes at least one of the following: a service type, a service identifier, or an APP ID. The first-information create request message requests to create a correspondence between an RSC and the service information.

In an example, if the service information is specific to a user, the first-information create request message may further carry identification information of the remote UE, for example, a generic public subscription identifier (GPSI), an IP address of the UE, or a MAC address of the UE. Alternatively, if the service information is specific to a user group, the first-information create request message may further carry an external group identifier.

S1001-*b*: The NEF network element checks whether to provide a first-information create service for the AF network element.

For example, the NEF network element may check whether the AF network element is authenticated by an operator. If the AF network element is authenticated by the operator, the NEF network element determines to provide the first-information create service for the AF network element. If the AF network element is not authenticated by the operator, the NEF network element rejects a first-information create request of the AF network element.

If the NEF network element determines, after the check, to provide the first-information create service for the AF network element, step S1001-*c* is performed. If the NEF network element determines, after the check, not to provide the first-information create service for the AF network element, the NEF network element rejects the first-information create request of the AF network element.

S1001-*c*: The NEF network element sends a first-information create request message to a PCF network element.

The first-information create request message carries one or more of a DNN, S-NSSAI, a subscription permanent identifier (SUPI), an internal group identifier, or the like. The DNN and/or the S-NSSAI are/is obtained by the NEF network element through mapping based on an AF ID (or an AF-Service-Identifier), the SUPI is obtained by the NEF network element through mapping based on the GPSI, and the internal group identifier is obtained by the NEF network element through mapping based on the external group identifier.

In another example, if an AF network element is authenticated by an operator, in step S1001-*d* shown in FIG. 10(*a*), the AF network element may directly request a PCF network element to create first information.

S1001-*d*: The AF network element sends a first-information create request message to the PCF network element.

The first-information create request message carries an internal identifier that can be identified by a core network element such as the PCF network element and that includes one or more of a DNN, S-NSSAI, an SUPI, an internal group identifier, or the like.

S1002: The PCF network element generates the first information.

The first information is for representing a service that the remote UE is allowed to transmit in relay mode. The first information may include one or more of the following service information: the DNN, the S-NSSAI, the APP ID, or the AF ID (or the AF-Service-Identifier). Alternatively, the first information may include the correspondence between the relay service code and the service information. For example, the first information may be in the list form shown in Table 2.

In an implementation, after the PCF network element generates the first information, the PCF network element may locally store the first information in the PCF network element.

In another implementation, after the PCF network element generates the first information, the PCF network element may alternatively send the first information to a UDM network element, to store the first information in the UDM network element. Alternatively, the PCF network element may send the first information to a UDR network element, to store the first information in the UDR network element. Alternatively, the PCF network element may send the first information to the AF network element, for example, directly send the first information to the AF network element or send the first information to the AF network element via the NEF network element, to store the first information in the AF network element. As shown in FIG. 10(*a*), the phase (1) may further include the following steps S1003-*a* and S1004-*a*.

S1003-*a*: The PCF network element sends the first information to the UDM/UDR network element.

S1004-*a*: The UDM/UDR network element stores the first information.

Alternatively, as shown in FIG. 10(*a*), the phase (1) may further include the following steps S1003-*b* and S1004-*b*.

S1003-*b*: The PCF network element sends the first information to the AF network element.

S1004-*b*: The AF network element stores the first information.

In another implementation, in step S1001-*e* shown in FIG. 10(*b*), an AF network element may alternatively create first information directly.

S1001-*e*: The AF network element generates the first information.

After the AF network element performs S1001-*e*, the AF network element may locally store the first information in the AF network element. Alternatively, the AF network element may send the first information to a UDM network element, to store the first information in the UDM network element; or send the first information to a UDR network element, to store the first information in the UDR network element. As shown in FIG. 10(*b*), after the AF network element performs S1001-*e*, the phase (1) of the proximity service communication method provided in this embodiment of this application may further include the following steps S1003-*c* and S1004-*c*.

S1003-*c*: The AF network element sends the first information to the UDM/UDR network element.

S1004-*c*: The UDM/UDR network element stores the first information.

In another implementation, a user plane logical network element ProSe function may alternatively directly create first information. For example, the ProSe function may be deployed in a PCF network element. After the ProSe function generates the first information, the ProSe function may store the first information in the PCF network element, an AF network element, or a UDM/UDR network element.

In another implementation, an application server of an application may alternatively directly create first information.

In another implementation, if a core network element (for example, a PCF network element) has created first information for an AF network element before, when service information of the AF network element is to be updated, the AF network element may further request to update the first information. The AF network element may send a first-information update request message to an NEF network element, where the first-information update request message requests to update a correspondence between an RSC and the service information. The first-information update request message may carry an RSC that the core network element (for example, the PCF network element) has allocated to the AF network element before. Then, the NEF network element checks whether to provide a first-information update service for the AF network element; and when determining to provide the first-information update service for the AF network element, sends a first-information update request message to a UDM/UDR network element, to indicate the UDM/UDR network element to update the first information. That the UDM/UDR network element updates the first information may include at least that the UDM/UDR network element adds service information of a service corresponding to the RSC, and/or deletes service information of one or more services corresponding to the RSC. After the UDM/UDR network element updates the first information, the UDM/UDR network element may locally store updated first information in the UDM/UDR network element. Alternatively, the UDM/UDR network element may send updated first information to the PCF network element, to store the updated first information in the PCF network element. Alternatively, the UDM/UDR network element may send the updated first information to the AF network element, to store the updated first information in the AF network element.

Alternatively, when the NEF network element determines to provide the first-information update service for the AF network element, the NEF network element may send a first-information update request message to the PCF network element, to indicate the PCF network element to update the first information. After the PCF network element updates the first information, the PCF network element may locally store updated first information in the PCF network element. Alternatively, the PCF network element may send updated first information to a UDM/UDR network element, to store the updated first information in the UDM/UDR network element. Alternatively, the PCF network element may send updated first information to the AF network element, for example, directly send the updated first information to the AF network element or send the updated first information to the AF network element via the NEF network element, to store the updated first information in the AF network element.

As shown in FIG. 11A, FIG. 11B, and FIG. 11C, the phase (2) may be completed by using the following steps S1101 to S1107.

S1101: The remote UE or the relay UE requests latest user policy information from the PCF network element.

User policy information includes ProSe communication policy information.

In an implementation, the remote UE or the relay UE may request the latest user policy information from the PCF network element when registering with a core network or updating the user policy information (for example, a UE policy).

In another implementation, when subscription data of the remote UE or the relay UE is updated, for example, when the PCF network element, the AF network element, the UDM/UDR network element, or the NEF network element creates/updates the first information, the PCF network element may alternatively actively send the latest user policy information to the remote UE or the relay UE.

Optionally, in an example, a message that is sent by the remote UE or the relay UE to the PCF network element and that requests the latest user policy information may carry a user identity (for example, the SUPI), so that the PCF network element can determine, based on the user identity, a corresponding ProSe communication policy in subscription information of the remote UE or the relay UE, where the ProSe communication policy includes first information corresponding to a service to which the remote UE or the relay UE subscribes.

S1102: The PCF network element obtains the first information.

If the PCF network element locally stores the created/updated first information in the PCF network element after performing step S1002 or updating the first information, the PCF network element may obtain the first information from a local storage unit of the PCF network element.

If the PCF network element stores the created/updated first information in the UDM/UDR network element after performing step S1002 or updating the first information, the PCF network element may obtain the first information from the UDM/UDR network element, as shown in S1102 in FIG. 11A, FIG. 11B, and FIG. 11C. For example, the PCF network element may request to obtain the first information from the UDM/UDR network element; or may subscribe to a first-information update service from the UDM/UDR network element. When the first information is updated, the UDM/UDR network element notifies the PCF network element of the updated first information.

S1103: The PCF network element sends the first information to the remote UE or the relay UE.

If the remote UE requests to obtain the latest user policy information, the PCF network element performs S1103-*a* shown in FIG. 11A, FIG. 11B, and FIG. 11C. That is, the PCF network element sends the first information to the remote UE. If the relay UE requests to obtain the latest user policy information, the PCF network element performs S1103-*b* shown in FIG. 11A, FIG. 11B, and FIG. 11C. That is, the PCF network element sends the first information to the relay UE.

For example, the PCF network element may store the first information (that is, the correspondence between the RSC and the service information) in a user policy container (for example, a UE policy container), and send the first information to the remote UE or the relay UE along with user configuration information of the remote UE and the relay UE via an AMF network element. The user configuration information may include a user access selection policy (access network discovery & selection policy, ANDSP) and a user route selection policy (UE route selection policy, URSP). The ANDSP is for providing the user with an access network selection basis, for example, a PLMN ID. The URSP is for providing the user with a routing manner of service processing, for example, a method for establishing a PDU session when a service needs to be initiated. For detailed descriptions of the user configuration information, refer to explanations and descriptions in a conventional technology. Details are not described.

In an example, if the correspondence that is between the RSC and the service information and that is in the first information is applicable only to a part of users, one or more user identities (for example, SUPIs) are sent by the PCF network element to the remote UE or the relay UE along with the first information.

In another example, if the message that is sent by the remote UE or the relay UE to the PCF network element and that requests the latest user policy information carries the user identity (for example, the SUPI), the PCF network element may determine, based on the user identity, the first information corresponding to the service to which the remote UE or the relay UE subscribes, and send the first information to the remote UE or the relay UE.

Optionally, in this embodiment of this application, if the first information is stored in the AF network element or the UDM/UDR network element, the AF network element may alternatively actively send the first information to the remote UE or the relay UE, as shown in S1104 in FIG. 11A, FIG. 11B, and FIG. 11C.

S1104: The AF network element sends the first information to the remote UE or the relay UE.

Correspondingly, the remote UE or the relay UE receives the first information from the AF network element.

In an implementation, the AF network element may send the first information to the remote UE or the relay UE through a user plane connection that has been established between the AF network element and the remote UE or the relay UE.

In an example, if the first information is stored in the UDM/UDR network element or the ProSe function network element, the ProSe function network element may alternatively actively send the first information to the remote UE or the relay UE. For example, the ProSe function network element obtains the first information from the UDM/UDR network element, and sends the first information to the remote UE or the relay UE.

S1105: The remote UE and the relay UE perform a relay discovery procedure.

For example, the relay UE may broadcast relay service information. After receiving a broadcast message of the relay UE, the remote UE that needs to transmit a service in relay mode may send a unicast establishment request message to the relay UE. The unicast establishment request message may carry an identity of the remote UE and information about the service (for example, service information of the first service) that needs to be transmitted in relay mode. Optionally, the unicast establishment request message may further carry the RSC corresponding to the first service, and the like. After receiving the unicast establishment request message of the remote UE, the relay UE may determine, based on the service information and the like carried in the unicast establishment request message, whether a relay service may be provided for the remote UE. If the relay UE determines to provide the relay service for the remote UE, the relay UE replies to the remote UE with a service accept feedback message. Then, the remote UE and the relay UE exchange, through a PC5 interface, signaling for establishing a PC5 connection, where the signaling includes operations such as configuring a sidelink radio bearer (SLRB) and performing QoS negotiation. If the relay UE determines not to provide the relay service for the remote UE, the relay UE replies with a connection reject message. For descriptions of the relay discovery procedure, refer to explanations and descriptions in the conventional technology. Details are not described.

When there is a requirement of transmitting the service data of the first service, and the remote UE or the relay UE determines, by querying the first information, that the data of the first service may be transmitted in relay mode, the remote UE or the relay UE performs the following step S1106, and then proceeds to step S1107.

S1106: The remote UE or the relay UE sends, to the AMF network element by using a PDU session establishment request message, the RSC (for example, the RSC 1) corresponding to the first service.

Correspondingly, the AMF network element receives, from the remote UE or the relay UE, the PDU session establishment request message that carries the RSC (for example, the RSC 1) corresponding to the first service.

The RSC corresponding to the first service is determined by the remote UE by querying the first information.

Alternatively, step S1106 may be: The remote UE or the relay UE sends, to the AMF network element by using a PDU session modification request message, the RSC (for example, the RSC 1) corresponding to the first service.

Alternatively, step S1106 may be: The remote UE or the relay UE sends, to the AMF network element by using a NAS message, the RSC (for example, the RSC 1) corresponding to the first service.

Alternatively, when setting up a service request or registering with a network via the relay UE, the remote UE may send, to the AMF network element by using another message, the RSC (for example, the RSC 1) corresponding to the first service. A manner of sending the RSC corresponding to the first service is not specifically limited in this embodiment of this application.

If the proximity service communication method provided in this embodiment of this application is based on a layer 2 relay scenario, a PDU session establishment request is initiated by the remote UE in S1106-*a* in FIG. 11A, FIG. 11B, and FIG. 11C. If the proximity service communication method provided in this embodiment of this application is based on a layer 3 relay scenario, a PDU session establishment request is initiated by the relay UE in S1106-*b* in FIG. 11A, FIG. 11B, and FIG. 11C.

S1107: The AMF network element sends the PDU session establishment request message to the SMF network element, where the PDU session establishment request message carries the RSC (for example, the RSC 1) corresponding to the first service.

Correspondingly, the SMF network element receives, from the AMF network element, the PDU session establishment request message that carries the RSC (for example, the RSC 1) corresponding to the first service.

In an implementation, if the SMF network element does not store the correspondence between the RSC and the service information (that is, the first information), the SMF network element performs the following step S1108.

In another implementation, if the SMF network element stores the correspondence between the RSC and the service information (that is, the first information), the SMF network element may determine, based on the RSC (for example, the RSC 1) carried in the PDU session establishment request message, service information (for example, the service information of the first service) corresponding to the RSC. Then, the SMF network element sends a PCC rule request message to the PCF network element, where the PCC rule request message carries first service information (namely, the service information of the first service), and requests to obtain a PCC rule of the first service. The first service information includes at least one of the following: a service type, a service identifier, or an APP ID of the first service.

The correspondence that is between the RSC and service information and that is stored in the SMF network element may be sent by the PCF network element to the SMF network element after the PCF network element creates/updates the first information; or may be sent by the PCF network element to the SMF network element when the remote UE or relay UE requests the latest user policy information from the PCF network element. An occasion for obtaining the first information by the SMF network element is not specifically limited in this embodiment of this application.

As shown in FIG. 11A, FIG. 11B, and FIG. 11C, the phase (3) may be completed by using the following steps S1108 to S1116.

S1108: The SMF network element sends a PCC rule request message to the PCF network element, where the PCC rule request message carries the RSC (for example, the RSC 1) corresponding to the first service.

Correspondingly, the PCF network element receives, from the SMF network element, the PCC rule request message that carries the RSC (for example, the RSC 1) corresponding to the first service.

Alternatively, in an example, the SMF network element may obtain, from the PCF network element by using a session management policy (SM Policy) request message, an SM policy of a service (namely, the first service) corresponding to the RSC 1. The SM policy includes a PCC rule of the service (namely, the first service) corresponding to the RSC 1.

S1109: The PCF network element determines the PCC rule of the service (namely, the first service) corresponding to the RSC 1.

For example, the PCF network element may determine, by querying the first information, that the service corresponding to the RSC 1 is the first service, and then the PCF network element obtains the PCC rule of the first service through querying. The PCC rule may usually include three types of information: service data flow detection information, policy control information, and charging-related information. For content of the PCC rule, refer to explanations and descriptions in the conventional technology. Details are not described herein again.

In an example, if the PCC rule request message carries the first service information, the PCF network element may directly obtain the PCC rule of the first service through querying.

S1110: The PCF network element sends, to the SMF network element, the PCC rule of the service corresponding to the RSC 1.

Correspondingly, the SMF network element receives, from the PCF network element, the PCC rule of the service corresponding to the RSC 1.

S1111: The SMF network element generates policy configuration information according to the PCC rule of the service corresponding to the RSC 1.

When the relay information includes the relay service code, the policy configuration information includes information about a service corresponding to the relay service code. For example, when the first network element is the AMF network element, and the relay information includes the relay service code, the policy configuration information includes user policy information or access management policy information of the service corresponding to the relay service code. For another example, when the first network element is the SMF network element, and the relay information includes the relay service code, the policy configuration information includes one or more of the following information: a PDR, an FAR, or an MAR.

S1112: The SMF network element sends the policy configuration information to a UPF network element.

Correspondingly, the UPF network element receives the policy configuration information from the SMF network element.

S1113: The SMF network element sends a PDU session establishment response message to the AMF network element, where the PDU session establishment response message may carry a PDU session identifier (for example, a PDU session ID), N2 SM information, an N1 SM container, and the like. The N2 SM information may include QoS configuration information, core network tunnel information, and the like. The N1 SM container may include PDU session establishment accept information, a QoS rule, and the like. The PDU session identifier uniquely identifies the PDU session. The N2 SM information is for configuring a radio bearer for the relay UE and the remote UE and establishing a link between an access network device and the UPF network element. The N1 SM container is for processing an uplink data packet according to the QoS rule.

Correspondingly, the AMF network element receives the PDU session establishment response message from the SMF network element.

In an example, the SMF network element may send the PDU session establishment response message to the AMF network element by using a Namf_Communication_N1N2MessageTransfer service.

S1114: The AMF network element sends the PDU session establishment response message to a radio access network.

The PDU session establishment response message may carry the PDU session identifier, the N2 SM information, the N1 SM container, and the like. The N2 SM information is used by the radio access network to configure the radio bearer for the relay UE and the remote UE based on the QoS configuration information and establish the link between the access network device and the UPF network element based on the core network tunnel information. The N1 SM container is used by the access network device to process the uplink data packet according to the QoS rule.

Correspondingly, the radio access network receives the PDU session establishment response message from the AMF network element.

S1115: The radio access network sends radio resource configuration information to the relay UE.

The radio resource configuration information may include configuration information of the radio bearer configured by the radio access network for the relay UE and the remote UE, for example, configuration information of an SLRB for data transmission between the relay UE and the remote UE, and configuration information of a data radio bearer (DRB) for data transmission between the relay UE and the access network device. The radio resource configuration information may be used by the relay UE to establish a radio link (for example, the DRB) between the relay UE and the radio access network, and includes a mapping relationship between a QoS flow and the DRB, a physical layer transmission resource configuration, and the like. In addition, the radio resource configuration information may be used by the relay UE to establish a radio link (for example, the SLRB) between the relay UE and the remote UE, and includes a mapping relationship between the QoS flow and the SLRB, the physical layer transmission resource configuration, and the like.

Correspondingly, the relay UE receives the radio resource configuration information from the radio access network.

S1116: The relay UE sends PC5 link configuration information to the remote UE.

The PC5 link configuration information includes a PC5 QoS parameter, the IP address of the remote UE, and the like.

Correspondingly, the remote UE receives the PC5 link configuration information from the relay UE.

In an example, for example, in the layer 2 relay scenario, the IP address of the remote UE may be sent by the SMF network element to the relay UE via the AMF network element by using the PDU session establishment response message. Then, the relay UE sends the IP address of the remote UE to the remote UE by using the PC5 link configuration information.

In another example, for example, in the layer 3 relay scenario, the IP address of the remote UE may be allocated by the relay UE to the remote UE, and the IP address of the remote UE is sent to the remote UE by using the PC5 link configuration information. Herein, the IP address used by the remote UE may be the same as an IP address of the relay UE (where for example, an IPv4 address is used). In this case, the relay UE may allocate a transmission control protocol (TCP)/user datagram protocol (UDP) port number to the remote UE.

After step S1116 is performed, a step shown in the phase (4) is performed.

Alternatively, as shown in FIG. 11A, FIG. 11B, and FIG. 11C, after step S1116 is performed, the proximity service communication method provided in this embodiment of this application may further include the following steps S1118 and S1119. In other words, the phase (3) may include the following steps S1108 to S1116, S1118, and S1119.

S1118: The relay UE sends the identification information and the IP address that are of the remote UE to the SMF network element.

For example, the identification information of the remote UE may be the ID of the remote UE.

Correspondingly, the SMF network element receives the identification information and the IP address that are of the remote UE from the relay UE.

S1119: The SMF network element updates the policy configuration information, where updated policy configuration information includes the IP address of the remote UE.

As shown in FIG. 11A, FIG. 11B, and FIG. 11C, the phase (4) includes the following step S1117.

S1117: The remote UE performs transmission of the service data of the first service with the application server via the relay UE.

In this application, in a process in which the remote UE performs transmission of the service data of the first service with the application server via the relay UE, the UPF network element monitors, based on the policy configuration information, the data forwarded by the relay UE.

When the relay UE performs step S1118 and the SMF network element performs step S1119, in step S1117, in the process in which the remote UE performs transmission of the service data of the first service with the application server via the relay UE, the UPF network element monitors, based on the updated policy configuration information, the data forwarded by the relay UE.

In the embodiment shown in FIG. 11A, FIG. 11B, and FIG. 11C, when the remote UE has a requirement of transmitting a service (for example, a requirement of transmitting the first service), the remote UE sends the relay service code (for example, the RSC 1) to the SMF network element, so that the SMF network element checks, based on the relay service code, whether the remote UE is allowed to transmit the first service in relay mode, and configures the policy configuration information for the UPF network element based on the relay service code when determining that the remote UE is allowed to transmit the first service in relay mode, so that the UPF network element monitors the service data forwarded by the relay UE, performs charging, and so on.

Optionally, in another example, a first network element is an AMF network element. Relay information sent by remote UE to the first network element includes a relay service code. The remote UE may send the relay service code, for example, an RSC 1, to the AMF network element when having a requirement of transmitting data of a first service. The RSC 1 is a relay service code corresponding to the first service. The remote UE sends, to the AMF network element, the relay service code corresponding to the first service, so that the AMF network element obtains policy configuration information, to detect service data transmitted by relay UE, and so on.

Figure 12A:
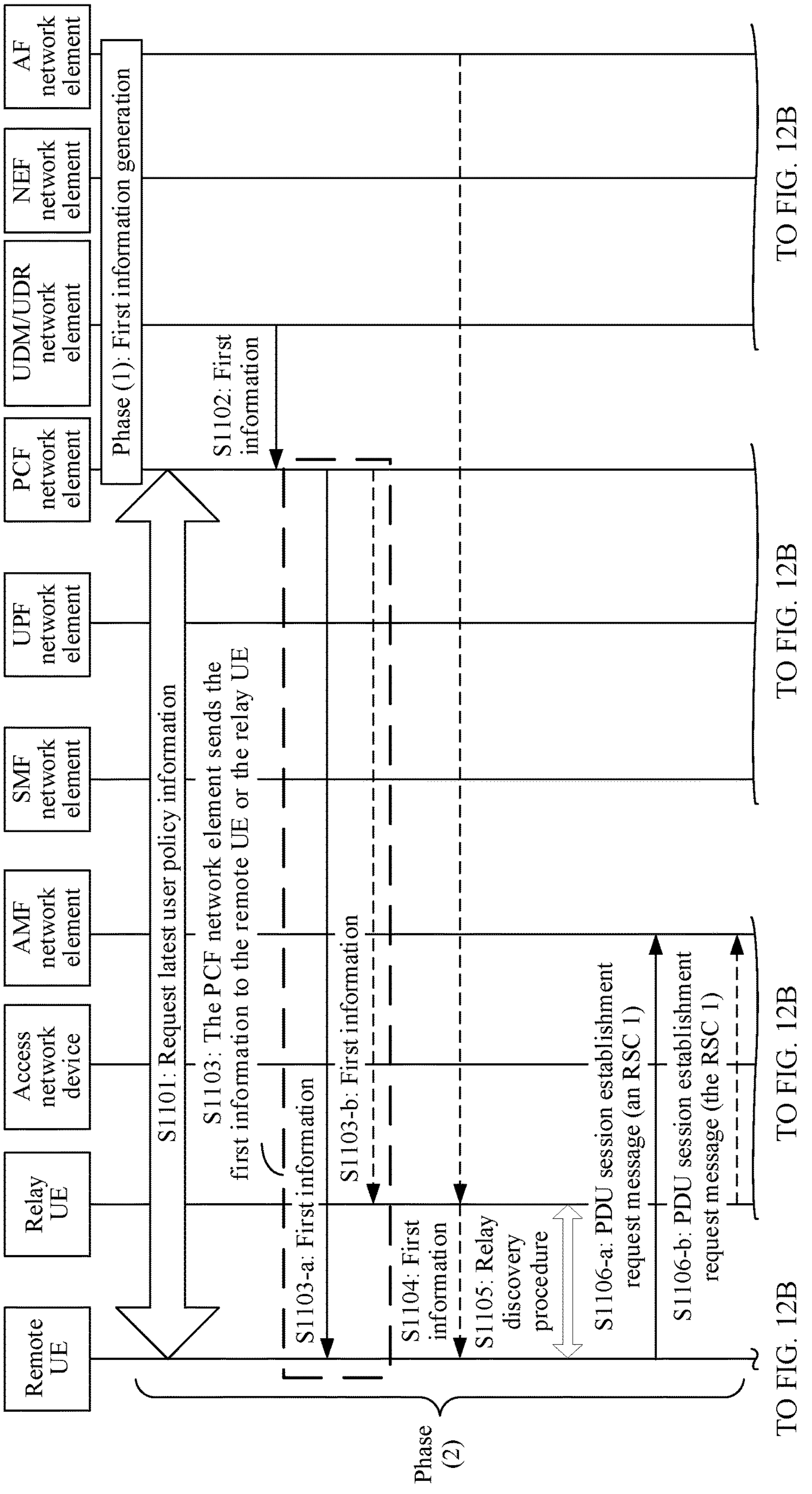
FIG. 12A and FIG. 12B are a diagram 2 of interaction in a proximity service communication method according to an embodiment of this application.
Figure 12B:
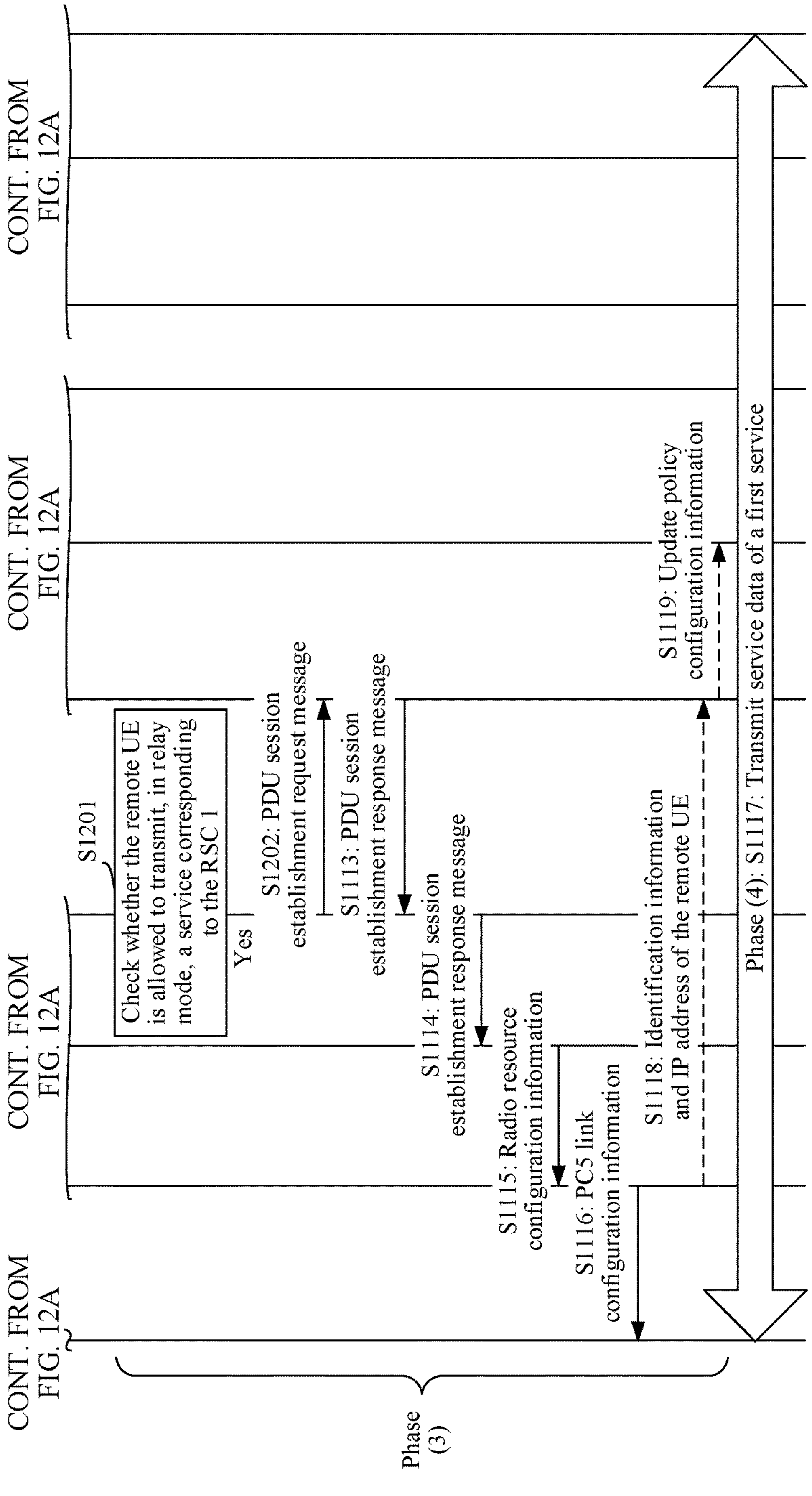

As shown in FIG. 12A and FIG. 12B, the method provided in this embodiment may be based on the embodiment shown in FIG. 11A, FIG. 11B, and FIG. 11C, and S1107 to S1112 are further replaced with S1201 and S1202. Details are as follows:

S1201: The AMF network element checks whether the remote UE is allowed to transmit, in relay mode, a service corresponding to the RSC 1.

For example, the AMF network element may check, by searching the first information, whether the service corresponding to the RSC 1 is in the first information, to check whether the remote UE is allowed to transmit, in relay mode, the service (namely, the first service) corresponding to the RSC 1. The first information is obtained by the AMF network element from the PCF network element in the process of step S1103, and is stored in the AMF network element.

If the AMF network element determines that the remote UE is allowed to transmit, in relay mode, the service corresponding to the RSC 1, the AMF network element performs the following step S1202. If the AMF network element determines that the remote UE is not allowed to transmit, in relay mode, the service corresponding to the RSC 1, the AMF network element sends, to the remote UE, indication information indicating rejection of transmitting, by the remote UE in relay mode, the service corresponding to the RSC 1. In addition, the AMF network element terminates a PDU session establishment procedure.

S1202: The AMF network element sends the PDU session establishment request message to the SMF network element.

In the embodiment shown in FIG. 12A and FIG. 12B, when the remote UE has a requirement of transmitting a service (for example, a requirement of transmitting the first service), the remote UE sends the relay service code (for example, the RSC 1) to the AMF network element, so that the AMF network element checks, based on the relay service code, whether the remote UE is allowed to transmit the first service in relay mode, and completes a subsequent PDU session establishment procedure when determining that the remote UE is allowed to transmit the first service in relay mode, so that the remote UE performs transmission of the service data of the first service with the application server via the relay UE. In this manner, the relay UE can be prevented from illegally forwarding application data of an unsubscribed application.

Optionally, in another example, a first network element is an SMF network element. Relay information sent by remote UE to the first network element (namely, the SMF network element) includes first indication information. The first indication information indicates that the remote UE is to transmit a service in relay mode. The remote UE may send the first indication information to the SMF network element when having a requirement of transmitting data of a first service. The remote UE sends the first indication information to the SMF network element, so that the SMF network element obtains policy configuration information, to monitor the first service transmitted by relay UE, perform related charging, and so on.

It should be noted that, in this example, a first-information create request message requests to create information about a service that can be transmitted in relay mode. First information may include one or more of the following: a DNN, S-NSSAI, an APP ID, or an AF ID (or an AF-Service-Identifier). For example, the first information may be in the list form shown in Table 1.

Figure 13A:
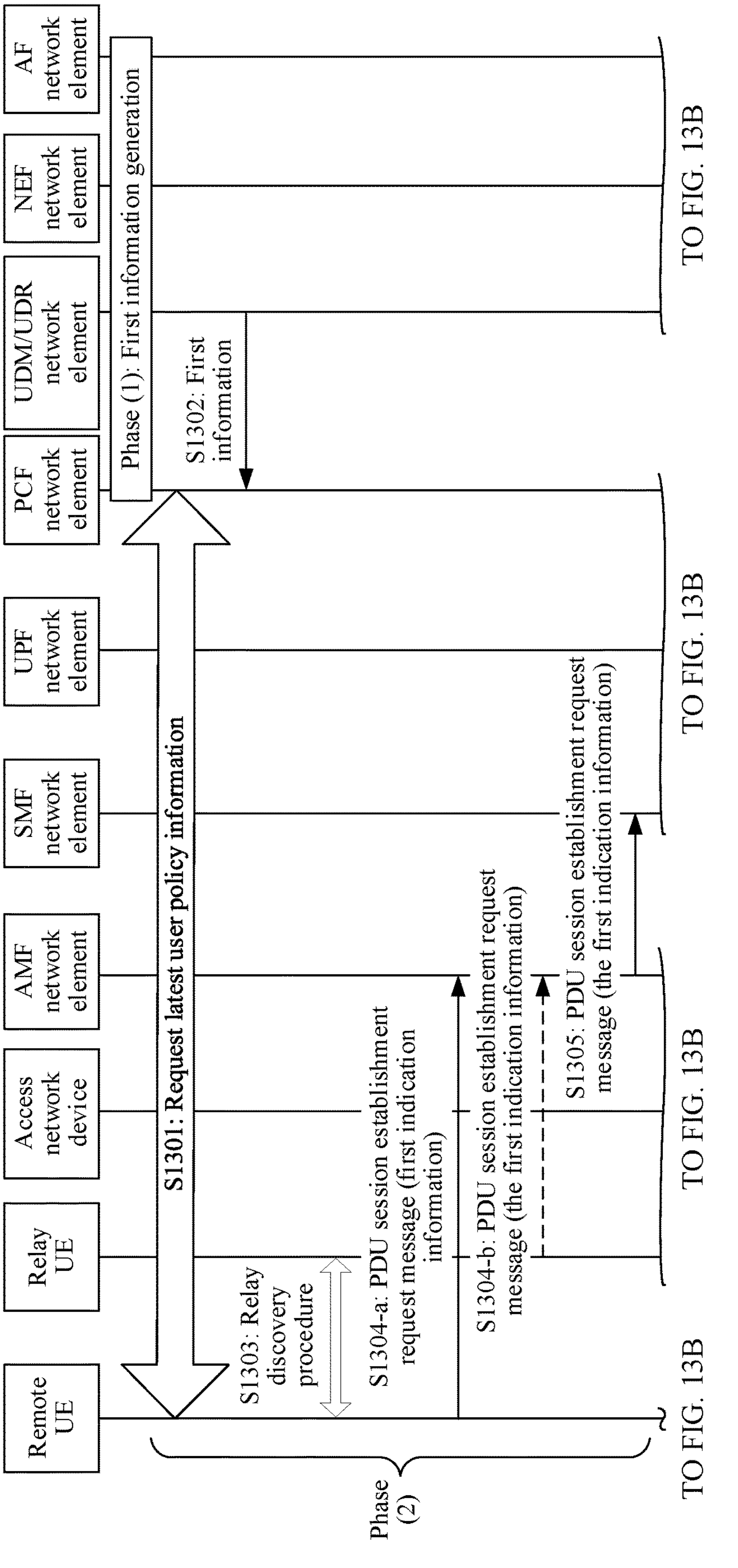
FIG. 13A, FIG. 13B, and FIG. 13C are a diagram 3 of interaction in a proximity service communication method according to an embodiment of this application.
Figure 13B:
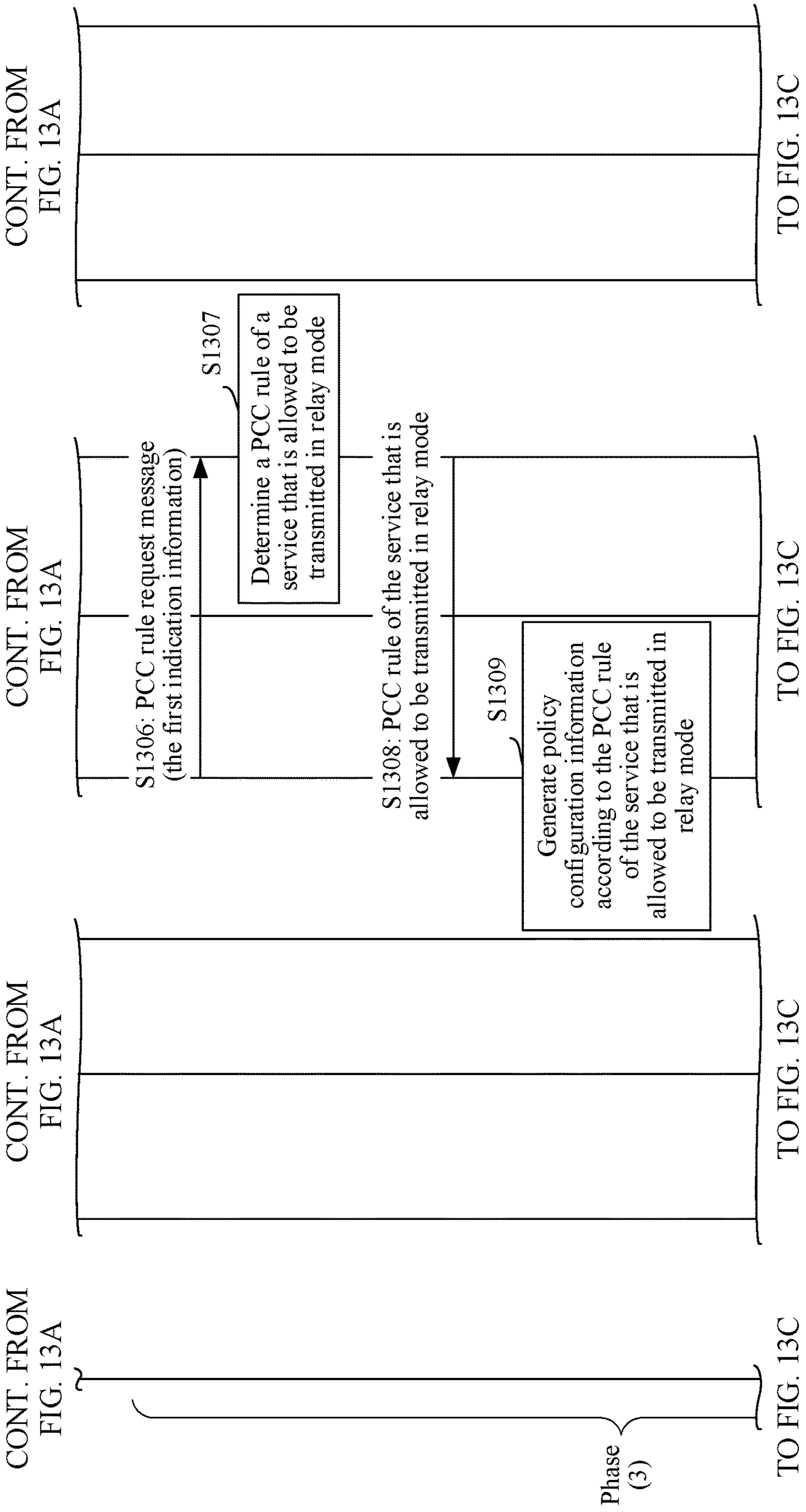
Figure 13C:
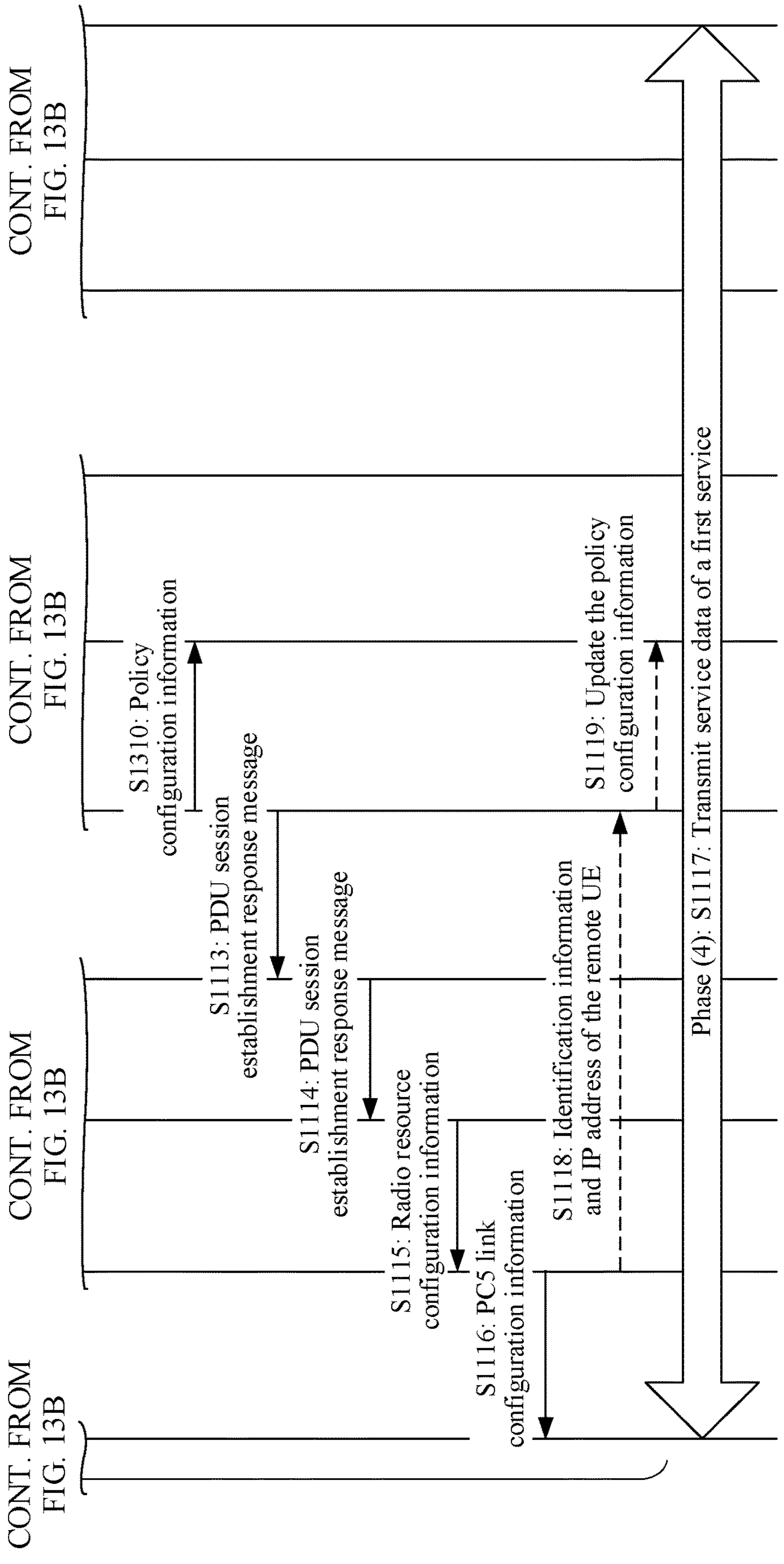

As shown in FIG. 13A, FIG. 13B, and FIG. 13C, the method provided in this embodiment may be based on the embodiment shown in FIG. 11A, FIG. 11B, and FIG. 11C, and S1101 to S1112 are further replaced with S1301 to S1310. Details are as follows.

S1301: The remote UE or the relay UE requests latest user policy information from the PCF network element.

In some embodiments, the remote UE or the relay UE may request the latest user policy information from the PCF network element when registering with a core network or updating user policy information (for example, a UE policy).

In some other embodiments, when subscription data of the remote UE or the relay UE is updated, for example, when the PCF network element, the AF network element, the UDM/UDR network element, or the NEF network element creates/updates the first information, the PCF network element may alternatively actively send the latest user policy information to the remote UE or the relay UE.

Optionally, in some embodiments, a message that is sent by the remote UE or the relay UE to the PCF network element and that requests the latest user policy information may carry a user identity (for example, the SUPI), so that the PCF network element can determine, based on the user identity, a corresponding ProSe communication policy in subscription information of the remote UE or the relay UE, where the ProSe communication policy includes first information corresponding to a service to which the remote UE or the relay UE subscribes.

S1302: The PCF network element obtains the first information.

For example, if the PCF network element stores the created/updated first information in the UDM/UDR network element after performing step S1002 or updating the first information, the PCF network element may obtain the first information from the UDM/UDR network element, as shown in S1302 in FIG. 13A, FIG. 13B, and FIG. 13C.

Alternatively, in another implementation, if the AF network element stores the created/updated first information in the UDM/UDR network element after performing step S1001-*e*, the PCF network element may obtain the first information from the UDM/UDR network element.

In another implementation, if the PCF network element locally stores the created/updated first information in the PCF network element after performing step S1002 or updating the first information, the PCF network element may obtain the first information from a local storage unit of the PCF network element.

In another implementation, if the AF network element locally stores the created/updated first information in the AF network element after performing step S1001-*e*, the PCF network element may obtain the first information from the AF network element.

S1303: The remote UE and the relay UE perform a relay discovery procedure.

When there is a requirement of transmitting the service data of the first service, and the remote UE or the relay UE determines to transmit the data of the first service in relay mode, the remote UE or the relay UE performs the following step S1304, and then proceeds to step S1305.

S1304: The remote UE or the relay UE sends first indication information to the AMF network element by using a PDU session establishment request message.

The first indication information indicates that the remote UE is to transmit a service in relay mode. The first indication information is carried in the PDU session establishment request message when the remote UE determines to transmit the data of the first service in relay mode.

Alternatively, step S1304 may be: The remote UE or the relay UE sends first indication information to an AMF network element by using a PDU session modification request message.

Alternatively, step S1304 may be: The remote UE or the relay UE sends first indication information to an AMF network element by using a NAS message.

Alternatively, when setting up a service request or registering with a network via the relay UE, the remote UE may send first indication information to an AMF network element by using another message. A manner of sending the first indication information is not specifically limited in this embodiment of this application.

If the proximity service communication method provided in this embodiment of this application is based on a layer 2 relay scenario, a PDU session establishment request is initiated by the remote UE in S1304-*a* in FIG. 13A, FIG. 13B, and FIG. 13C. If the proximity service communication method provided in this embodiment of this application is based on a layer 3 relay scenario, a PDU session establishment request is initiated by the relay UE in S1304-*b* in FIG. 13A, FIG. 13B, and FIG. 13C.

S1305: The AMF network element sends the PDU session establishment request message to the SMF network element. The PDU session establishment request message carries the first indication information.

Correspondingly, the SMF network element receives, from the AMF network element, the PDU session establishment request message that carries the first indication information.

S1306: The SMF network element sends a PCC rule request message to the PCF network element, where The PCC rule request message carries the first indication information.

Alternatively, in an implementation, the SMF network element may obtain, from the PCF network element by using a session management policy (SM Policy) request message, an SM policy of a service that is allowed to be transmitted in relay mode. The SM policy includes a PCC rule of the service that is allowed to be transmitted in relay mode.

Correspondingly, the PCF network element receives, from the SMF network element, the PCC rule request message that carries the first indication information.

In an example, the PCC rule request message sent by the SMF network element to the PCF network element may further carry the identification information of the remote UE (for example, an ID of the remote UE).

S1307: The PCF network element determines the PCC rule of the service that is allowed to be transmitted in relay mode.

For example, the PCF network element may determine, by querying the first information, the service that is allowed to be transmitted in relay mode, and then the PCF network element obtains, through querying, the PCC rule of the service that is allowed to be transmitted in relay mode. The PCC rule may usually include three types of information: service data flow detection information, policy control information, and charging-related information.

In some embodiments, if the PCC rule request message sent by the SMF network element to the PCF network element further carries the identification information of the remote UE (for example, the ID of the remote UE), step S1307 may include: The PCF network element determines a PCC rule of a service to which the remote UE subscribes and that is allowed to be transmitted in relay mode.

S1308: The PCF network element sends, to the SMF network element, the PCC rule of the service that is allowed to be transmitted in relay mode.

Correspondingly, the SMF network element receives, from the PCF network element, the PCC rule of the service that is allowed to be transmitted in relay mode.

In some embodiments, if the PCC rule request message sent by the SMF network element to the PCF network element further carries the identification information of the remote UE (for example, the ID of the remote UE), step S1308 may include: The PCF network element sends, to the SMF network element, the PCC rule of the service to which the remote UE subscribes and that is allowed to be transmitted in relay mode.

S1309: The SMF network element generates policy configuration information according to the PCC rule of the service that is allowed to be transmitted in relay mode.

The policy configuration information includes information about the service that the remote UE is allowed to transmit in relay mode. For example, the policy configuration information may include one or more of the following information: a PDR, an FAR, or an MAR.

In some embodiments, if the SMF network element receives, from the PCF network element, the PCC rule of the service to which the remote UE subscribes and that is allowed to be transmitted in relay mode, step S1309 includes: The SMF network element generates policy configuration information according to the PCC rule of the service to which the UE subscribes and that is allowed to be transmitted in relay mode.

S1310: The SMF network element sends the policy configuration information to the UPF network element.

Correspondingly, the UPF network element receives the policy configuration information from the SMF network element.

In the embodiment shown in FIG. 13A, FIG. 13B, and FIG. 13C, in the process in which the remote UE performs transmission of the service data of the first service with the application server via the relay UE, the UPF network element monitors, based on the policy configuration information, the data forwarded by the relay UE.

In the embodiment shown in FIG. 13A, FIG. 13B, and FIG. 13C, when the remote UE has a requirement of transmitting a service (for example, a requirement of transmitting the first service), the remote UE sends the first indication information to the SMF network element, so that the SMF network element checks, based on the first indication information, whether the remote UE is allowed to transmit the first service in relay mode, and configures the policy configuration information for the UPF network element based on the first indication information when determining that the remote UE is allowed to transmit the first service in relay mode, so that the UPF network element monitors the service data forwarded by the relay UE, performs charging, and so on.

Optionally, in another example, a first network element is an AMF network element. Relay information sent by remote UE to the first network element includes first indication information. The remote UE may send the first indication information to the AMF network element when having a requirement of transmitting data of a first service, so that the AMF network element obtains policy configuration information, to detect service data transmitted by relay UE, and so on.

Figure 14A:
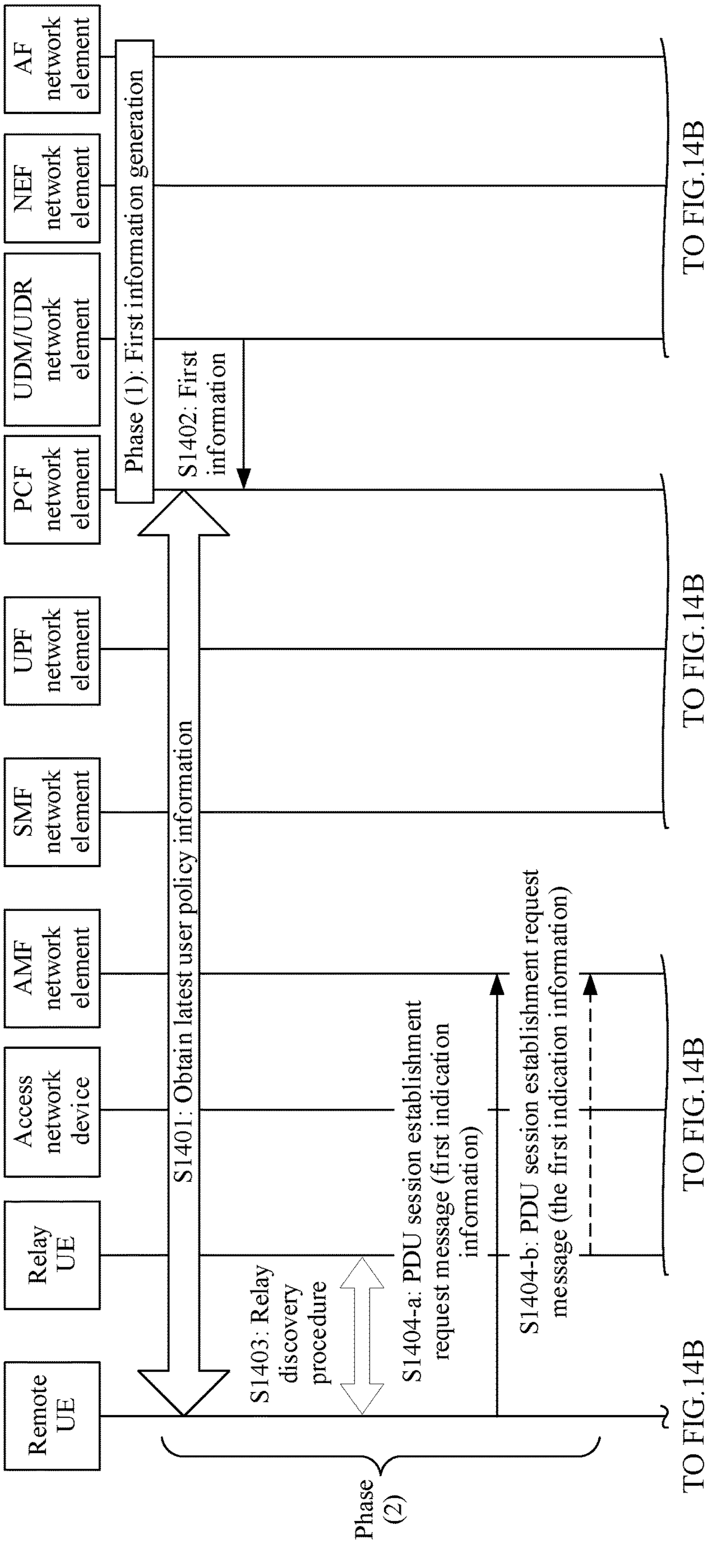
FIG. 14A, FIG. 14B, and FIG. 14C are a diagram 4 of interaction in a proximity service communication method according to an embodiment of this application.
Figure 14B:
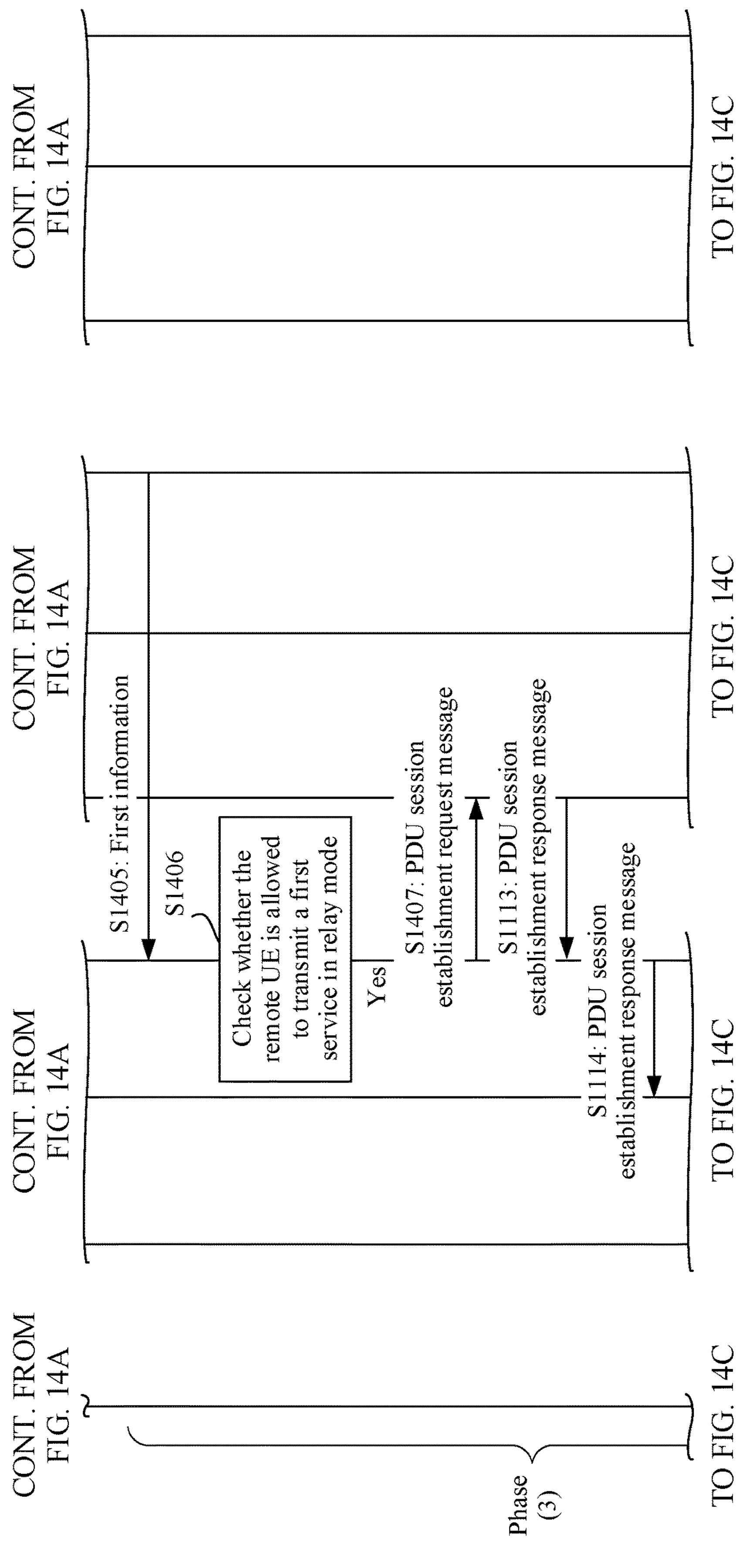
Figure 14C:
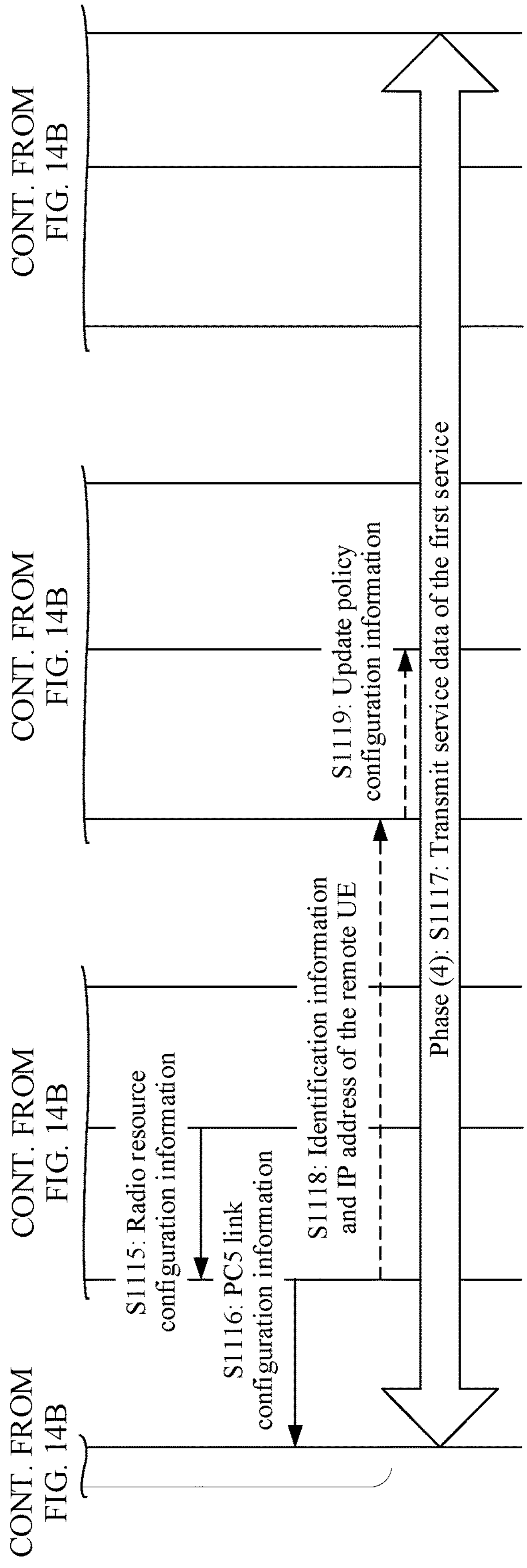

As shown in FIG. 14A, FIG. 14B, and FIG. 14C, the method provided in this embodiment may be based on the embodiment shown in FIG. 11A, FIG. 11B, and FIG. 11C, and S1101 to S1112 are further replaced with S1401 to S1407. Details are as follows.

S1401: The remote UE or the relay UE obtains latest user policy information from the PCF network element.

In some embodiments, the remote UE or the relay UE may request the latest user policy information from the PCF network element when registering with a core network or updating user policy information (for example, a UE policy).

In some other embodiments, when subscription data of the remote UE or the relay UE is updated, for example, when the PCF network element, the AF network element, the UDM/UDR network element, or the NEF network element creates/updates the first information, the PCF network element may alternatively actively send the latest user policy information to the remote UE or the relay UE.

Optionally, in some embodiments, a message that is sent by the remote UE or the relay UE to the PCF network element and that requests the latest user policy information may carry a user identity (for example, the SUPI), so that the PCF network element can determine, based on the user identity, a corresponding ProSe communication policy in subscription information of the remote UE or the relay UE, where the ProSe communication policy includes first information corresponding to a service to which the remote UE or the relay UE subscribes.

S1402: The PCF network element obtains the first information.

For example, if the PCF network element stores the created/updated first information in the UDM/UDR network element after performing step S1002 or updating the first information, the PCF network element may obtain the first information from the UDM/UDR network element, as shown in S1402 in FIG. 14A, FIG. 14B, and FIG. 14C.

Alternatively, in another implementation, if the AF network element stores the created/updated first information in the UDM/UDR network element after performing step S1001-*e*, the PCF network element may obtain the first information from the UDM/UDR network element.

In another implementation, if the PCF network element locally stores the created/updated first information in the PCF network element after performing step S1002 or updating the first information, the PCF network element may obtain the first information from a local storage unit of the PCF network element.

In another implementation, if the AF network element locally stores the created/updated first information in the AF network element after performing step S1001-*e*, the PCF network element may obtain the first information from the AF network element.

S1403: The remote UE and the relay UE perform a relay discovery procedure.

When there is a requirement of transmitting the service data of the first service, and the remote UE or the relay UE determines to transmit the data of the first service in relay mode, the remote UE or the relay UE performs the following step S1304, and then proceeds to step S1305.

S1404: The remote UE or the relay UE sends first indication information to the AMF network element by using a PDU session establishment request message.

The first indication information indicates that the remote UE is to transmit a service in relay mode. The first indication information is carried in the PDU session establishment request message when the remote UE determines to transmit the data of the first service in relay mode.

Alternatively, step S1404 may be: The remote UE or the relay UE sends first indication information to an AMF network element by using a PDU session modification request message.

Alternatively, step S1404 may be: The remote UE or the relay UE sends first indication information to an AMF network element by using a NAS message.

Alternatively, when setting up a service request or registering with a network via the relay UE, the remote UE may send first indication information to an AMF network element by using another message. A manner of sending the first indication information is not specifically limited in this embodiment of this application.

If the proximity service communication method provided in this embodiment of this application is based on a layer 2 relay scenario, a PDU session establishment request is initiated by the remote UE in S1404-*a* in FIG. 14A, FIG. 14B, and FIG. 14C. If the proximity service communication method provided in this embodiment of this application is based on a layer 3 relay scenario, a PDU session establishment request is initiated by the relay UE in S1404-*b* in FIG. 14A, FIG. 14B, and FIG. 14C.

S1405: The AMF network element obtains the first information from the PCF network element.

For example, the AMF network element may obtain, from the PCF network element, the first information stored in the PCF network element. Alternatively, the AMF network element may obtain, via the PCF network element, the first information stored in the UDM/UDR network element.

Alternatively, in some embodiments, the AMF network element may obtain the first information from the AF network element. For example, the AMF network element may obtain, from the AF network element, the first information stored in the AF network element. Alternatively, the AMF network element may obtain, via the AF network element, the first information stored in the UDM/UDR network element.

S1406: The AMF network element checks whether the remote UE is allowed to transmit the first service in relay mode.

For example, the AMF network element may check, by searching the first information, whether the first service is in the first information, to check whether the remote UE is allowed to transmit the first service in relay mode. The first information is obtained by the AMF network element from the PCF network element in the process of step S1405, and is stored in the AMF network element.

If the AMF network element determines that the remote UE is allowed to transmit the first service in relay mode, the AMF network element performs the following step S1407. If the AMF network element determines that the remote UE is not allowed to transmit the first service in relay mode, the AMF network element sends, to the remote UE, indication information indicating rejection of transmitting the first service by the remote UE in relay mode. In addition, the AMF network element terminates a PDU session establishment procedure.

S1407: The AMF network element sends the PDU session establishment request message to the SMF network element.

In the embodiment shown in FIG. 14A, FIG. 14B, and FIG. 14C, when the remote UE has a requirement of transmitting a relay service (for example, a requirement of transmitting the first service), the remote UE sends the first indication information to the AMF network element, so that the AMF network element checks, based on the first indication information, whether the remote UE is allowed to transmit the first service in relay mode, and completes a subsequent PDU session establishment procedure when determining that the remote UE is allowed to transmit the first service in relay mode, so that the remote UE performs transmission of the service data of the first service with the application server via the relay UE. In this manner, the relay UE can be prevented from illegally forwarding application data of an unsubscribed application.

It should be understood that the solutions in embodiments of this application may be properly combined for use, and explanations or descriptions of terms in embodiments may be cross-referenced or explained in embodiments. This is not limited.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

It may be understood that, to implement a function of any one of the foregoing embodiments, the relay UE, the remote UE, the first network element (for example, the SMF network element or the AMF network element), the access network device, the second network element (for example, the PCF network element or the AF network element), or another network device (for example, the NEF network element, the UPF network element, the UDM network element, or the UDR network element) includes a corresponding hardware structure and/or software module for performing each function. A person skilled in the art should be easily aware that, in combination with units and algorithm steps of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the functions of each particular application, but it should not be considered that the implementation goes beyond the scope of this application.

In embodiments of this application, function module division may be performed on a device such as the relay UE, the remote UE, the first network element (for example, the SMF network element or the AMF network element), the access network device, the second network element (for example, the PCF network element or the AF network element), or another network device (for example, the NEF network element, the UPF network element, the UDM network element, or the UDR network element). For example, each function module may be obtained through division based on each corresponding function, or two or more functions may be integrated into one processing module. The integrated module may be implemented in a form of hardware, or may be implemented in a form of a software function module. It should be noted that, in embodiments of this application, division into the modules is an example, and is merely logical function division. Another division manner may be used during actual implementation.

Figure 15:
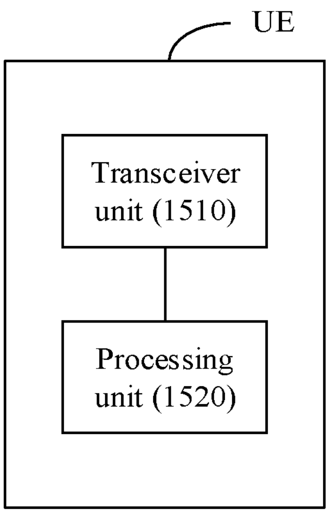
FIG. 15 is a block diagram of a structure of UE according to an embodiment of this application.

For example, when function modules are obtained through division in an integrated manner, FIG. 15 is a block diagram of a structure of UE according to an embodiment of this application. The UE may be relay UE or remote UE. The UE may include a transceiver unit 1510 and a processing unit 1520.

When the UE is the relay UE, the transceiver unit 1510 is configured to support the relay UE in performing step S1101, 1103-*b*, S1104, S1105, S1106-*a*, S1106-*b*, S1115, S1116, S1117, S1301, S1303, S1304-*a*, S1304-*b*, S1401, S1403, S1404-*a*, or S1404-*b*, and/or is configured to perform another process of the technology in this specification. The processing unit 1520 is configured to coordinate with the transceiver unit 1510 to support the relay UE in performing step S1101, S1105, S1117, S1301, S1303, S1401, or S1403, and/or is configured to perform another process of the technology in this specification. When the UE is the remote UE, the transceiver unit 1510 is configured to support the remote UE in performing step S701, S801, S1101, S1103-*a*, S1104, S1105, S1106-*a*, S1116, S1117, S1301, S1303, S1304-*a*, S1401, S1403, or S1404-*a*, and/or is configured to perform another process of the technology in this specification. The processing unit 1520 is configured to support the remote UE in performing step S801 or S901, or is configured to coordinate with the transceiver unit 1510 to support the remote UE in performing step S1105, S1117, S1301, S1303, S1401, or S1403, and/or is configured to perform another process of the technology in this specification.

Figure 16:
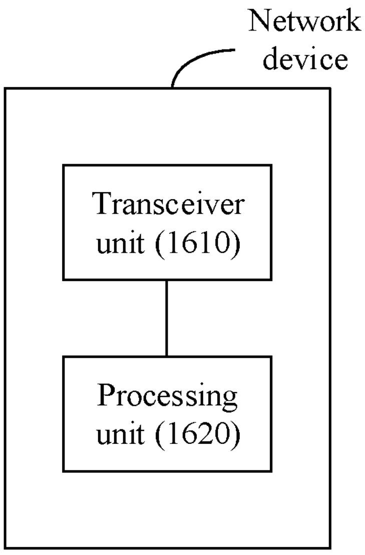
FIG. 16 is a block diagram of a structure of a network device according to an embodiment of this application.

FIG. 16 is a block diagram of a structure of a network device according to an embodiment of this application. The network device may be a network device such as the access network device, the SMF network element, the AMF network element, the PCF network element, the AF network element, the NEF network element, the UPF network element, the UDM network element, or the UDR network element. The network device may include a transceiver unit 1610 and a processing unit 1620.

When the network device is the access network device, the transceiver unit 1610 may support the access network device in assisting in performing step S1101, S1103-*a*, S1103-*b*, S1104, S1106-*a*, S1106-*b*, S1114, S1115, S1118, S1117, S1301, S1304-*a*, S1304-*b*, S1401, S1404-*a*, or S1404-*b*, and/or is configured to perform another process of the technology in this specification. The processing unit 1620 is configured to coordinate with the transceiver unit 1610 to support the access network device in performing step S1101, S1117, S1301, or S1401, and/or is configured to perform another process of the technology in this specification.

When the network device is the SMF network element, the transceiver unit 1610 may support the SMF network element in performing step S701, S1101, S1107, S1108, S1110, S1112, S1113, S1118, S1119, S1202, S1305, S1306, S1308, S1310, or S1407, or support the SMF network element in assisting in performing step S1103-*a*, S1103-*b*, S1104, S1117, S1401, or S1405, and/or is configured to perform another process of the technology in this specification. The processing unit 1620 is configured to support the SMF network element in performing step S702, S1111, or S1309, or is configured to support the SMF network element in assisting in performing step S1101 or S1117, and/or is configured to perform another process of the technology in this specification.

When the network device is the AMF network element, the transceiver unit 1610 may support the AMF network element in performing step S701, S1106-*a*, S1106-*b*, S1107, S1113, S1114, S1202, S1304-*a*, S1304-*b*, S1305, S1404-*a*, S1404-*b*, S1405, or S1407, or support the AMF network element in assisting in performing step S1101, S1103-*a*, S1103-*b*, S1104, S1118, S1117, S1301, or S1401, and/or is configured to perform another process of the technology in this specification. The processing unit 1620 is configured to support the AMF network element in performing step S702, S1201, or S1406, or support the AMF network element in assisting in performing step S1101, S1117, S1301, or S1401, and/or is configured to perform another process of the technology in this specification.

When the network device is the PCF network element, the transceiver unit 1610 may support the PCF network element in performing step S1001-*c*, S1001-*d*, S1003-*a*, S1003-*b*, S1102, S1103-*a*, S1103-*b*, S1108, S1110, S1302, S1306, S1308, S1402, or S1405, or support the PCF network element in assisting in performing step S1101, S1104, S1117, S1301, or S1401, and/or is configured to perform another process of the technology in this specification. The processing unit 1620 is configured to support the PCF network element in performing step S1002, S1109, or S1307, or support the PCF network element in assisting in performing step S1101, S1117, S1301, or S1401, and/or is configured to perform another process of the technology in this specification.

When the network device is the AF network element, the transceiver unit 1610 may support the AF network element in performing step S1001-*a*, S1001-*d*, S1003-*b*, S1003-*c*, or S1104, or support the AF network element in assisting in performing step S1117, and/or is configured to perform another process of the technology in this specification. The processing unit 1620 is configured to support the AF network element in performing step S1004-*b* or S1001-*e*, or support the AF network element in assisting in performing step S1117, and/or is configured to perform another process of the technology in this specification.

When the network device is the NEF network element, the transceiver unit 1610 may support the NEF network element in performing step S1001-*a* or S1001-*c*, and/or is configured to perform another process of the technology in this specification. The processing unit 1620 is configured to support the NEF network element in performing step S1001-*b*, and/or is configured to perform another process of the technology in this specification.

When the network device is the UPF network element, the transceiver unit 1610 may support the UPF network element in performing step S1112, S1119, or S1301, or support the UPF network element in assisting in performing step S1117, and/or is configured to perform another process of the technology in this specification. The processing unit 1620 is configured to support the UPF network element in assisting in performing step S1117, and monitor, in a process of performing S1117, service data forwarded by relay UE, and/or is configured to perform another process of the technology in this specification.

When the network device is the UDM/UDR network element, the transceiver unit 1610 may support the UDM/UDR network element in performing step S1001-*a*, S1003-*c*, S1102, S1302, or S1402, and/or is configured to perform another process of the technology in this specification. The processing unit 1620 is configured to support the UDM/UDR network element in assisting in performing step S1004-*a* or S1004-*c*, and/or is configured to perform another process of the technology in this specification.

It should be noted that the transceiver unit 1510 and the transceiver unit 1610 may include a radio frequency circuit. The UE or the network device may receive and send a radio signal by using a radio frequency circuit. The radio frequency circuit usually includes but is not limited to an antenna, at least one amplifier, a transceiver, a coupler, a low noise amplifier, a duplexer, and the like. In addition, the radio frequency circuit may further communicate with another device through wireless communication. Any communication standard or protocol may be used for the wireless communication, and includes but is not limited to a global system for mobile communications, a general packet radio service, code division multiple access, wideband code division multiple access, long term evolution, an e-mail message, a short message service message service, and the like.

In an optional manner, when software is for implementing data transmission, the data transmission may be implemented totally or partially in a form of a computer program product. The computer program product includes one or more computer instructions. When the computer program instructions are loaded and executed on a computer, the procedure or functions according to embodiments of this application are all or partially implemented. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Method or algorithm steps described with reference to embodiments of this application may be implemented by hardware, or may be implemented by a processor by executing software instructions. The software instruction may include a corresponding software module. The software module may be located in a RAM, a flash, a ROM, an EPROM, an EEPROM, a register, a hard disk, a removable hard disk, a CD-ROM, or a storage medium of any other form known in the art. For example, a storage medium is coupled to a processor, so that the processor can read information from the storage medium or write information to the storage medium. Certainly, the storage medium may alternatively be a component of the processor. The processor and the storage medium may be disposed in an ASIC. In addition, the ASIC may be located in a detection apparatus. Certainly, the processor and the storage medium may alternatively exist in the detection apparatus as discrete components.

Based on the foregoing descriptions of the implementations, a person skilled in the art may clearly understand that, for the purpose of convenient and brief description, only division into the foregoing function modules is used as an example for description. During actual application, the foregoing functions may be allocated to different function modules and implemented based on a requirement. That is, an inner structure of an apparatus is divided into different function modules to implement all or some of the foregoing functions.

In an optional manner, this application provides a communication system. The communication system includes remote UE, relay UE, an access network device, an AMF unit, an SMF network element, a UPF network element, and a PCF unit. The communication system may further include an NEF network element, a UDM/UDR network element, or an AF network element. The communication system is configured to implement the method in any implementation provided in this application.

In an optional manner, this application provides a chip system. The chip system includes a processor and a memory. The memory stores computer program code. When the computer program code is executed by the processor, the method in any implementation provided in this application is implemented. The chip system may include a chip, or may include the chip and another discrete component.

In the several embodiments provided in this application, it should be understood that the disclosed device and method may be implemented in other manners. For example, the foregoing apparatus embodiments are merely examples. For example, division into the modules or units is merely logical function division. During actual implementation, there may be another division manner. For example, a plurality of units or components may be combined or integrated into another apparatus, or some features may be ignored or not performed. In addition, the displayed or discussed mutual coupling, direct coupling, or communication connection may be implemented through some interfaces. The indirect coupling or communication connection between the apparatuses or units may be implemented in electrical, mechanical, or another form.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in embodiments of this application essentially, the part contributing to the prior art, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods in embodiments of this application. The foregoing storage medium includes: any medium that can store program code, for example, a USB flash drive, a removable hard disk, a read-only memory (ROM), a random access memory (RAM), a magnetic disk, or an optical disc.

The foregoing descriptions are merely implementations of this application, but the protection scope of this application is limited thereto. Any variation or replacement within the technical scope disclosed in this application shall fall within the protection scope of this application. Therefore, the protection scope of this application shall be subject to the protection scope of the claims.

What is claimed is:

1. A proximity service communication method, comprising:

receiving, by a remote user equipment (UE), first information from a policy control function (PCF) network element, the first information representing at least one service that the remote UE is allowed to transmit in a relay mode, wherein the first information comprises at least one application identifier (APP ID), and the APP ID indicates an application to which a service belongs;

determining, by the remote UE based on the first information, to transmit data of a first service by using a relay UE; and sending, by the remote UE, first indication information to a session management function (SMF), wherein the first indication information indicating that the remote UE is to transmit the first service in the relay mode, the first indication information is used for the session management function to obtain policy configuration information, and the policy configuration information is used for a user plane function (UPF) detecting data of the first service forwarded by the relay UE for the remote UE.

2. The method according to claim 1, wherein the relay mode comprises layer 2 relay or layer 3 relay.

3. The method according to claim 1, wherein the first indication information comprises a service type, wherein the service type is represented by a data network name (DNN) and/or single network slice selection assistance information (S-NSSAI).

4. The method according to claim 3, wherein the first service is a service of the service type.

5. The method according to claim 1, wherein the first information further comprises the first indication information.

6. The method according to claim 1, wherein the determining, by the remote UE based on the first information, to transmit data of a first service by using a relay UE comprises:

in response to the first service corresponding to an APP ID in the first information, determining, by the remote UE, to transmit the data of the first service in the relay mode.

7. The method according to claim 1, wherein the policy configuration information comprises one or more of: a packet detection rule (PDR), a forwarding action rule (FAR), or a multi-access rule (MAR).

8. A remote user equipment (UE), the remote UE comprising:

a memory storing instructions; and at least one processor in communication with the memory, the at least one processor configured, upon execution of the instructions, to perform the following steps:

receiving first information from a policy control function (PCF) network element, the first information representing at least one service that the remote UE is allowed to transmit in a relay mode, wherein the first information comprises at least one application identifier (APP ID), and the APP ID indicates an application to which a service belongs;

determining, based on the first information, to transmit data of a first service by using a relay UE; and sending, by the remote UE, first indication information to a session management function, the first indication information indicating that the remote UE is to transmit the first service in the relay mode, the first indication information is used for the session management function to obtain policy configuration information, and the policy configuration information is used for a user plane function (UPF) detecting data of the first service forwarded by the relay UE for the remote UE.

9. The remote UE according to claim 8, wherein the relay mode comprises layer 2 relay or layer 3 relay.

10. The remote UE according to claim 8, wherein the first indication information comprises a service type, wherein the service type is represented by a data network name (DNN) and/or single network slice selection assistance information (S-NSSAI).

11. The remote UE according to claim 10, wherein the first service is a service of the service type.

12. The remote UE according to claim 8, wherein the first information further comprises the first indication information.

13. The remote UE according to claim 8, wherein the at least one processor is further configured to:

in response to the first service corresponding to an APP ID in the first information, determine to transmit the data of the first service in the relay mode.

14. The remote UE according to claim 8, wherein the policy configuration information comprises one or more of: a packet detection rule (PDR), a forwarding action rule (FAR), or a multi-access rule (MAR).

15. A chip system, comprising:

a memory storing computer program code; and at least one processor in communication with the memory, the at least one processor configured, upon execution of the computer program code, to perform the following steps:

receiving first information from a policy control function (PCF) network element, the first information representing at least one service that a remote user equipment (UE) is allowed to transmit in a relay mode, wherein the first information comprises at least one application identifier (APP ID), and the APP ID indicates an application to which a service belongs;

determining, based on the first information, to transmit data of a first service by using a relay UE; and sending first indication information to a session management function (SMF), the first indication information indicating that the remote UE is to transmit the first service in the relay mode, the first indication information is used for the session management function to obtain policy configuration information, and the policy configuration information is used for a user plane function (UPF) detecting data of the first service forwarded by the relay UE for the remote UE.

16. The chip system according to claim 15, wherein the relay mode comprises layer 2 relay or layer 3 relay.

17. The chip system according to claim 15, wherein the first indication information comprises a service type, wherein the service type is represented by a data network name (DNN) and/or single network slice selection assistance information (S-NSSAI).

18. The chip system according to claim 17, wherein the first service is a service of the service type.

19. The chip system according to claim 15, wherein the first information further comprises the first indication information.

20. The chip system according to claim 15, wherein the at least one processor is further configured to:

in response to the first service corresponding to an APP ID in the first information, determine to transmit the data of the first service in the relay mode.

* * * * *